(12) United States Patent
Haneda

(10) Patent No.: US 6,625,627 B2
(45) Date of Patent: Sep. 23, 2003

(54) RECORDING APPARATUS AND RECORDING METHOD, REPRODUCING APPARATUS AND REPRODUCING METHOD, AND RECORDING MEDIUM

(75) Inventor: Naoya Haneda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/981,006

(22) Filed: Oct. 16, 2001

(65) Prior Publication Data

US 2003/0097517 A1 May 22, 2003

Related U.S. Application Data

(62) Division of application No. 09/368,066, filed on Aug. 3, 1999.

(30) Foreign Application Priority Data

Aug. 5, 1998 (JP) .......................................... P10-221343

(51) Int. Cl.[7] .......................... G06F 12/00; G06F 17/30
(52) U.S. Cl. ...................................................... 707/205
(58) Field of Search .......................... 710/71; 707/200, 707/201, 202, 203, 204, 205; 711/200, 114

(56) References Cited

U.S. PATENT DOCUMENTS

| | | | | |
|---|---|---|---|---|
| 5,475,668 A | * | 12/1995 | Azumatani et al. | 360/48 |
| 5,537,636 A | * | 7/1996 | Uchida et al. | 369/59.14 |
| 5,588,012 A | * | 12/1996 | Oizumi | 714/781 |
| 5,664,187 A | * | 9/1997 | Burkes et al. | 707/200 |
| 5,687,361 A | * | 11/1997 | Sarkar | 707/1 |
| 5,696,934 A | * | 12/1997 | Jacobson et al. | 714/5 |
| 6,021,462 A | * | 2/2000 | Minow et al. | 711/111 |
| 6,047,362 A | * | 4/2000 | Zucker | 711/133 |
| 6,094,693 A | * | 7/2000 | Haneda | 710/36 |
| 6,189,014 B1 | * | 2/2001 | Nakashima et al. | 369/272 |
| 6,219,321 B1 | * | 4/2001 | Serizawa et al. | 369/47.33 |
| 6,233,648 B1 | * | 5/2001 | Tomita | 711/103 |
| 6,327,638 B1 | * | 12/2001 | Kirby | 711/4 |

OTHER PUBLICATIONS

"Microsoft Press Computer Dictionary", Microsoft Press, 3rd edition, p. 404.*

* cited by examiner

Primary Examiner—Greta Robinson
Assistant Examiner—Susan Rayyan
(74) Attorney, Agent, or Firm—Sonnenschein, Nath & Rosenthal LLP

(57) ABSTRACT

File management information for managing logical sequence of files recorded in a recording medium is formed and stored in a file management information storing unit. Block management information which includes a file number for identifying a file, sequential order number indicative of the sequential order of the block storing data of the file and page length information indicative of the size of the data stored in the block is formed and stored in a block management information storing unit. Access to the file is ensured based on the block management information, even when the file management information indicative of the logical sequence of the files is lost by accident.

50 Claims, 18 Drawing Sheets

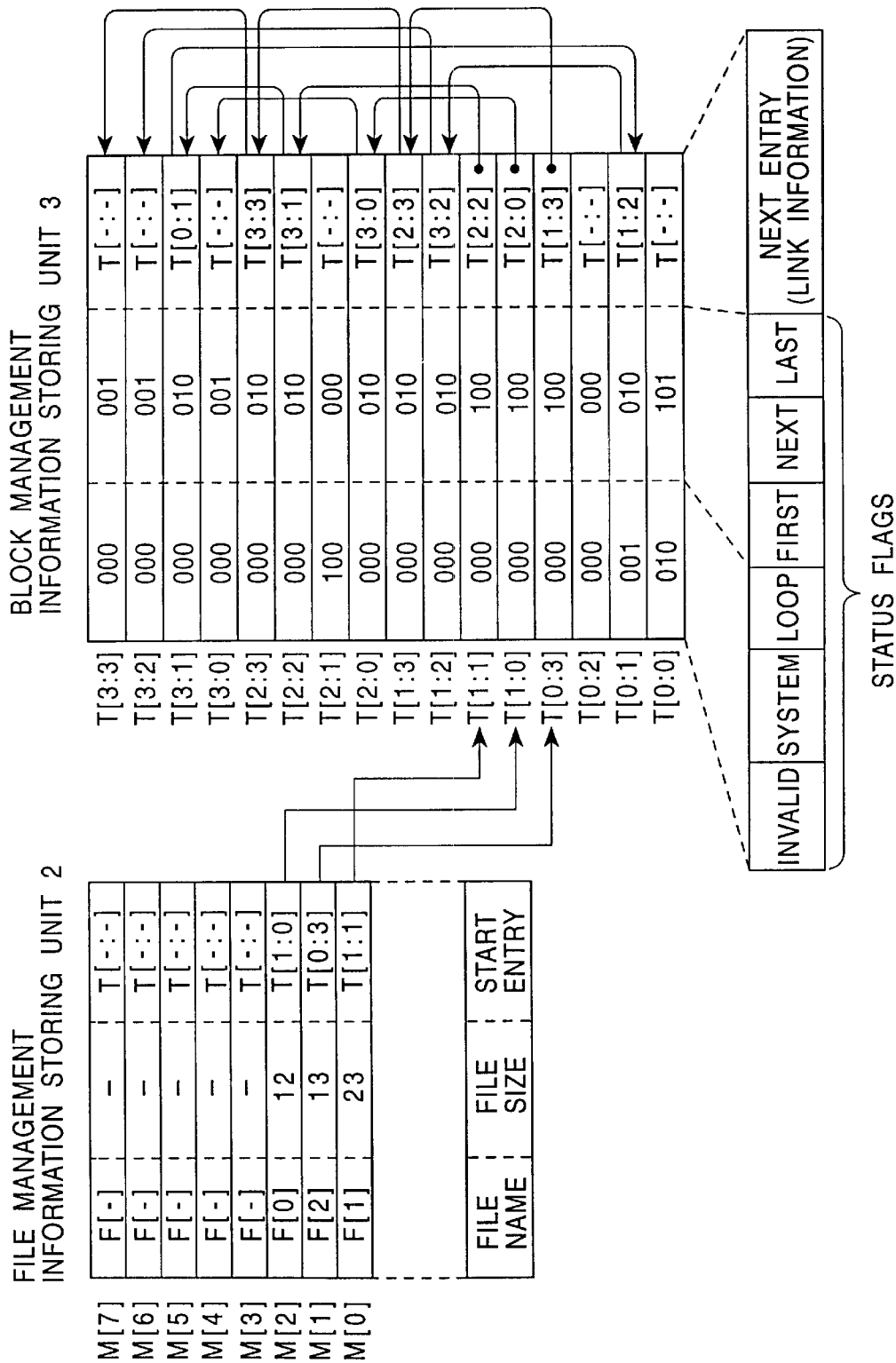

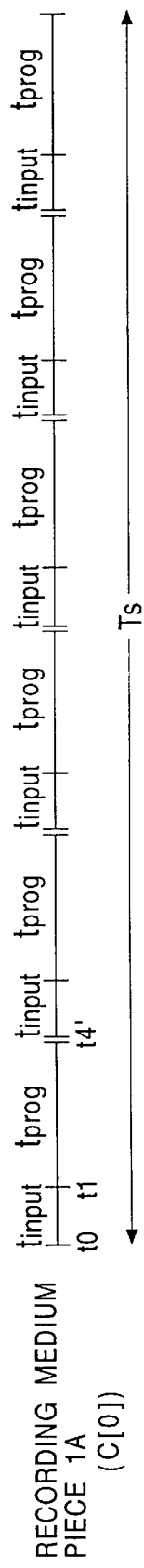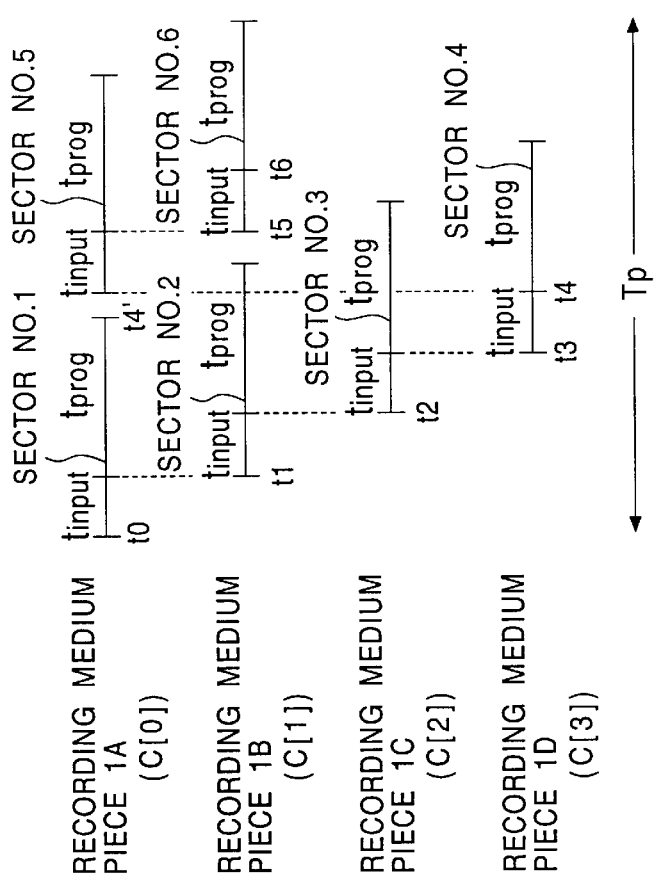
FIG. 3A
FIG. 3B

RECORDING APPARATUS AND RECORDING METHOD, REPRODUCING APPARATUS AND REPRODUCING METHOD, AND RECORDING MEDIUM

RELATED APPLICATION DATA

This application claims priority to Japanese Application No. P10-221343, filed Aug. 5, 1998 and is a divisional of U.S. application Ser. No. 09/368,066, filed Aug. 3, 1999, both of which are incorporated herein by reference to the extent permitted by law.

BACKGROUND OF THE INVENTION

1. Field of the Invention

The present invention relates to a recording apparatus and recording method, reproducing apparatus and reproducing method, and recording medium; and particularly relates to a recording apparatus and recording method, reproducing apparatus and reproducing method, and recording medium which are suitable for use in recording and/or reproducing data while managing the recording area of a recording medium on a predetermined block basis.

2. Description of the Related Art

The assignee of this application has already proposed a system which transfers data such as video, audio, character, computer program, and other likewise data, particularly digital data, from an information providing apparatus to portable user terminals equipped with a recording medium such as semiconductor memory, thereby providing various types of service, in Japanese Unexamined Patent Application Publication No. 6-131371, Japanese Unexamined Patent Application Publication No. 6-215010, Japanese Unexamined Patent Application Publication No. 6-301601, etc., for example.

According to such a system, for example, the user can carry a user terminal, go to a location where an information providing apparatus is set up, receive audio data or the like from the information providing apparatus, receive the data in the recording medium, and reproduce the data with the user terminal thereby listening to music in this case. In other words, in this case, the user does not need to purchase a CD (compact disk) or magnetic tape with audio data recorded therein in order to be provided with the music. Also, in the event that the user grows tired of that piece of music, the user can be provided with audio data for a new piece of music, and listen to the new music.

Since portability is required for such user terminals, non-volatile memory such as flash memory which is capable of holding data even without back-up of a battery or the like, is preferably used for the recording medium.

However, flash memory has a problem in that the program time necessary for writing input data into the flash memory is relatively longer in comparison to the data input time necessary for inputting the data therein, so in the event that the amount of data to be written is greater than the amount of data which can be input to the flash memory at once, a wait time consisting only of program time occurs between completion of input of data to the flash memory to input of the next data. Allowing such a wait time to occur means that more time is required for providing data to each user. On the other hand, the information providing apparatuses are used by a great number of users, so required a greater amount of time for each user results in making the other users wait, consequently resulting in fewer users being able to receive the service.

Accordingly, the present assignee has already proposed a recording method wherein a plurality of flash memory chips are used, and data is written thereto in a parallel manner, thereby reducing the amount of time required to write the data (hereafter referred to as the "parallel recording method").

The parallel recording method is an arrangement wherein, for example, data is input to one chip of a plurality of pieces of flash memory, and when that input is completed, the next data is input to another chip, and when that input is completed, the next data is input to yet another chip, and so on. That is to say, while the data input to one chip is being written thereto, the next data is being input to another chip, thereby allowing the next data to be input without waiting for the program time of the first chip, thereby reducing the amount of time necessary for writing data.

Now, data is written to and read from flash memory in units called pages, and data is deleted therefrom in units of blocks, which are comprised of several pages. Thus, the pages are finer units than blocks.

Accordingly, with the parallel recording method, data is managed in units of blocks, to enable efficient writing, deleting, and so forth. More specifically, block management information for managing each of blocks is formed for each of the blocks, and each block is managed based on its peculiar block management information.

Similarly, the parallel recording technique employs file management information which is formed for each of the files. Each file is managed based on the associated file management information.

In the above-described parallel recording technique proposed by the present assignee, the block management information lacks any information concerning the file of the data stored in the block managed by the block management information. In other words, information concerning the file is contained only in the file managing information. This poses a risk that the access to the file is impeded in the event of destruction of the file managing information due to, for example, accidental drop of the voltage of the electric power supplied to the apparatus, even if the date of the file and the block management information managing the block storing the data are alive.

SUMMARY OF THE INVENTION

The present invention has been made in light of the above state, and accordingly, it is an object of the present invention to ensure accessibility to files even when file management information is destructed.

To these ends, according to a first aspect of the present invention, there is provided a recording apparatus for recording data in a recording medium by managing a recording area in the recording medium on a block basis, comprising: file management information storing means for storing file management information for managing logical sequential order of each of files stored in the recording medium; block management information storing means for storing block management information including information for identifying each of the files, information indicative of the logical sequential order of the block in which the data of each file is recorded, and information indicative of the size of the data recorded in the block; and record controlling means for recording a file in the recording medium and for forming the file administration information and the block management information concerning the file.

In accordance with a second aspect of the present invention, there is provided a recording method for recording data in a recording medium by managing a recording area in the recording medium on a block basis, comprising: a file management information storing step for storing file management information for managing logical sequential order of each of files stored in the recording medium; a block management information storing step for storing block management information including information for identifying each of the files, information indicative of the logical sequential order of the block in which the data of each file is recorded, and information indicative of the size of the data recorded in the block; and a record controlling step for recording a file in the recording medium and for forming the file administration information and the block management information concerning the file.

In accordance with a third aspect of the present invention, there is provided a reproducing apparatus for reproducing data from a recording medium by managing a recording area in the recording medium on a block basis, comprising: file management information storing means for storing file management information for managing logical sequential order of each of the files stored in the recording medium; block management information storing means for storing block management information including information for identifying each of the files, information indicative of the logical sequential order of the block in which the data of each file is recorded, and information indicative of the size of the data recorded in the block; and reproduction controlling means for reproducing one of the recorded files based on the file administration information and the block management information concerning the file.

In accordance with a fourth aspect of the present invention, there is provided a reproducing method for reproducing data from a recording medium by managing a recording area in the recording medium on a block basis, comprising: reproducing the file containing the data, based both on file management information for managing logical sequential order of each of files stored in the recording medium and block management information including information for identifying each of the files, information indicative of the logical sequence of the blocks in which the data of each file is recorded, and information indicative of the size of the data recorded in the blocks.

In accordance with a fifth aspect of the present invention, there is provided a recording medium having a recording area for recording data of files, the recording area being managed on a predetermined block basis, wherein access to each of the files is managed based both on file management information for managing logical sequential order of each of files stored in the recording medium and block management information which includes information for identifying each of the files, information indicative of the logical sequence of the blocks in which the data of each file is recorded, and information indicative of the size of the data recorded in the blocks.

The invention in its sixth aspect provides a recording apparatus for recording data of files in a recording medium by managing a recording area in the recording medium on a block basis, comprising: block management information storing means for storing block management information including information for identifying each of the files, information indicative of the logical sequential order of the block in which the data of each file is recorded, and information indicative of the size of the data recorded in the block; record controlling means for recording a file in the recording medium and for forming the block management information concerning the file; and block link management information forming means for forming, based on the block management information, block link management information including link information indicative of the state of linkage between the blocks in which the data of the file is recorded.

The present invention in its seventh aspect provides a recording method for recording data of files in a recording medium by managing a recording area in the recording medium on a block basis, comprising: a record controlling step for recording a file in the recording medium, and forming block management information including information for identifying the file, information indicative of the logical sequential order of the block in which the data of the file is recorded, and information indicative of the size of the data recorded in the block; and block link management information forming step for forming, based on the block management information, block link management information including link information indicative of the state of linkage between the blocks in which the data of the file is recorded.

The present invention in its eighth aspect provides a reproducing apparatus for reproducing data of a file from a recording medium by managing a recording area in the recording medium on a block basis, comprising: block management information storing means for storing block management information which includes information for identifying each of the files, information indicative of the logical sequential order of the block in which the data of each file is recorded, and information indicative of the size of the data recorded in the block; block link management information forming means for forming, based on the block management information, block link management information including link information indicative of the state of linkage between the blocks in which the data of the file is recorded; and reproduction controlling means for reproducing the file based on the block management information and the block link management information.

The present invention in its ninth aspect provides a reproducing method for reproducing data of a file from a recording medium by managing a recording area in the recording medium on a block basis, comprising: block link management information forming step for forming block link management information including link information indicative of the state of linkage between the blocks in which the data of the file is recorded, based on block management information which includes information for identifying the file, information indicative of the logical sequential order of the block in which the data of the file is recorded, and information indicative of the size of the data recorded in the block; and reproduction controlling step for reproducing the file based on the block management information and the block link management information.

In accordance with a tenth aspect of the present invention, there is provided a recording medium having a recording area managed on a predetermined block basis, for recording data of a file, wherein block link management information is formed to include link information indicative of the state of linkage between the blocks in which the data of the file is recorded, based on block management information which includes information for identifying the file, information indicative of the logical sequential order of the block in which the data of the file is recorded, and information indicative of the size of the data recorded in the block; and wherein access to the file is managed based on the block management information and the block link management information.

In accordance with an eleventh aspect of the present invention, there is provided a recording apparatus for recording data of a file in a parallel manner in a recording medium by managing a recording area in the recording medium on a block basis, comprising: parallel block forming means for forming at least one parallel block constituted by at least one block, for enabling the data of the file to be recorded in at least one block in the parallel manner; record controlling means for recording the data of the file in the parallel manner in the block or blocks constituting the parallel block; block link management storing means for storing block link management information concerning the parallel block constituted by the block or blocks in which the data of the file is recorded; and computing means for computing position information concerning the position of the data of the file based on the block link management information.

In accordance with twelfth aspect of the present invention, there is provided a recording method for recording data of a file in a parallel manner in a recording medium by managing a recording area in the recording medium on a block basis, comprising: parallel block forming step for forming at least one parallel block constituted by at least one block, for enabling the data of the file to be recorded in at least one block in the parallel manner; record controlling step for recording the data of the file in the parallel manner in the block or blocks constituting the parallel block; and computing step for computing position information concerning the position of the data of the file based on block link management information which includes information concerning the parallel block constituted by the block or blocks in which the data of the file is recorded.

In accordance with a thirteenth aspect of the present invention, there is provided a reproducing apparatus for reproducing, by managing the recording area of a recording medium on a block basis, data which has been stored in the recording medium in a parallel manner, wherein at least one parallel block constituted by at least one block, for enabling the data of a file to be recorded in at least one block in the parallel manner, has been formed and the data of the file has been recorded in the parallel manner in the bock or blocks constituting the parallel block, the reproducing apparatus comprising; block link management information storing means for storing block link management information concerning the parallel block constituted by the block or blocks in which the data of the file is recorded; reproduction controlling means for reproducing the data of the file based on the block link management information; and computing means for computing, based on the block link management information, position information concerning the position of the data of the file which is being reproduced.

In accordance with a fourteenth aspect of the present invention, there is provided a reproducing method for reproducing, by managing the recording area of a recording medium on a block basis, data which has been stored in the recording medium in a parallel manner, wherein at least one parallel block constituted by at least one block, for enabling the data of a file to be recorded in at least one block in the parallel manner, has been formed and the data of the file has been recorded in the parallel manner in the bock or blocks constituting the parallel block, the reproducing method comprising: reproduction controlling step for reproducing the data of the file based on block link management information which includes information concerning the parallel block constituted by block or blocks in which the data of the file has been recorded; and computing step for computing, based on the block link management information, position information concerning the position of the data of the file which is being reproduced.

In accordance with a fifteenth aspect of the present invention, there is provided a recording medium having a recording area managed on a predetermined block basis to record data of a file in a parallel manner, wherein at least one parallel block constituted by at least one block, for enabling the data of a file to be recorded in at least one block in the recording area in the parallel manner, has been formed and the data of the file has been recorded in the parallel manner in the bock or blocks constituting the parallel block, and position information concerning the position of the data of the file is computed, based on block link management information including information concerning the parallel block constituted by the block or blocks in which the data of the file is recorded.

Thus, in the recording apparatus in accordance with the first aspect of the present invention, the file management information storing means stores file management information for managing logical sequential order of each of files stored in the recording medium, and the block management information storing means stores block management information which includes information for identifying each of the files, information indicative of the logical sequential order of the block in which the data of each file is recorded, and information indicative of the size of the data recorded in the block. The record controlling means serves to record a file in the recording medium and for forming the file administration information and the block management information concerning the file.

In the recording method in accordance with the second aspect of the present invention, steps are employed for forming file management information for managing logical sequential order of each of files stored in the recording medium, and for forming block management information including information for identifying each of the files, information indicative of the logical sequential order of the block in which the data of each file is recorded, and information indicative of the size of the data recorded in the block.

In the reproducing apparatus in accordance with the third aspect of the present invention, the file management information storing means stores file management information for managing logical sequential order of each of the files stored in the recording medium, while the block management information storing means stores block management information which includes information for identifying each of the files, information indicative of the logical sequential order of the block in which the data of each file is recorded, and information indicative of the size of the data recorded in the block. The reproducing apparatus also comprises the reproduction controlling means which reproduces one of the recorded files based on the file administration information and the block management information concerning the file.

In the reproducing method in accordance with the fourth aspect of the present invention, a file is reproduced based both on file management information for managing logical sequential order of each of files stored in the recording medium and block management information which includes information for identifying each of the files, information indicative of the logical sequence of the blocks in which the data of each file is recorded, and information indicative of the size of the data recorded in the blocks.

In the recording medium in accordance with the fifth aspect of the present invention, access to each of the files is managed based both on file management information for managing logical sequential order of each of files stored in the recording medium and block management information which includes information for identifying each of the files, information indicative of the logical sequence of the blocks in which the data of each file is recorded, and information indicative of the size of the data recorded in the blocks.

In the recording apparatus of the sixth aspect of the present invention, the block management information storing means stores block management information including information for identifying each of the files, information indicative of the logical sequential order of the block in which the data of each file is recorded, and information indicative of the size of the data recorded in the block, while the record controlling means serves to record a file in the recording medium and forms the block management information concerning the file. The block link management information forming means forms, based on the block management information, block link management information including link information indicative of the state of linkage between the blocks in which the data of the file is recorded.

The recording method in accordance with the seventh aspect employs, in addition to the step of recording a file in the recording medium, the steps of forming block management information including information for identifying the file, information indicative of the logical sequential order of the block in which the data of the file is recorded, and information indicative of the size of the data recorded in the block, and forming, based on the block management information, block link management information including link information indicative of the state of linkage between the blocks in which the data of the file is recorded.

In the reproducing apparatus of the eighth aspect of the present invention, the block management information storing means stores block management information which includes information for identifying each of the files, information indicative of the logical sequential order of the block in which the data of each file is recorded, and information indicative of the size of the data recorded in the block. The block link management information forming means forms, based on the block management information, block link management information including link information indicative of the state of linkage between the blocks in which the data of the file is recorded. The reproduction controlling means reproduces the file based on the block management information and the block link management information.

In the reproducing method in accordance with the ninth aspect, block link management information including link information indicative of the state of linkage between the blocks in which the data of the file is recorded is formed based on block management information which includes information for identifying the file, information indicative of the logical sequential order of the block in which the data of the file is recorded, and information indicative of the size of the data recorded in the block. Reproduction of the file is performed based on the block management information and the block link management information.

In the recording medium in accordance with the tenth aspect, block link management information is formed to include link information indicative of the state of linkage between the blocks in which the data of the file is recorded, based on block management information which includes information for identifying the file, information indicative of the logical sequential order of the block in which the data of the file is recorded, and information indicative of the size of the data recorded in the block. Access to the file is managed based on the block management information and the block link management information.

In the recording apparatus in accordance with the eleventh aspect of the present invention, the parallel block forming means forms at least one parallel block constituted by at least one block, for enabling the data of the file to be recorded in at least one block in the parallel manner. The record controlling means records the data of the file in the parallel manner in the block or blocks constituting the parallel block. The block link management storing means stores block link management information concerning the parallel block constituted by the block or blocks in which the data of the file is recorded. The computing means computes position information concerning the position of the data of the file based on the block link management information.

In the recording method in accordance with the twelfth aspect of the present invention, parallel block forming step forms at least one parallel block constituted by at least one block, for enabling the data of the file to be recorded in at least one block in the parallel manner. The record controlling step records the data of the file in the parallel manner in the block or blocks constituting the parallel block. The computing computes position information concerning the position of the data of the file, based on block link management information which includes information concerning the parallel block constituted by the block or blocks in which the data of the file is recorded.

In the reproducing apparatus in accordance with the thirteenth aspect of the present invention, the block link management information storing means stores block link management information concerning the parallel block constituted by the block or blocks in which the data of the file is recorded. The reproduction controlling means reproduces the data of the file based on the block link management information. The computing means computes, based on the block link management information, position information concerning the position of the data of the file which is being reproduced.

In the reproducing method in accordance with the fourteenth aspect of the present invention, the data of a file is reproduced based on block link management information which includes information concerning the parallel block constituted by block or blocks in which the data of the file has been recorded. The position information concerning the position of the data of the file which is being reproduced is computed based on the block link management information.

In the recording medium in accordance with the fifteenth aspect of the present invention, at least one parallel block constituted by at least one block, for enabling the data of a file to be recorded in at least one block in the recording area in the parallel manner, has been formed and the data of the file has been recorded in the parallel manner in the bock or blocks constituting the parallel block. Position information concerning the position of the data of the file is computed, based on block link management information including information concerning the parallel block constituted by the block or blocks in which the data of the file is recorded.

The above and other objects, features and advantages of the present invention will become clear from the following description taken in conjunction with the accompanying drawings.

BRIEF DESCRIPTION OF THE DRAWINGS

FIG. 2 is a diagram illustrating the file management information and block management information for a case wherein data has been written according to the parallel recording method proposed previously by the present assignee;

FIG. 3 is a diagram for describing the increase in speed in writing data, according to the parallel recording method proposed previously by the present assignee;

DESCRIPTION OF THE PREFERRED EMBODIMENTS

A preferred embodiment of the present invention will now be described, preceded by a description in which, in order to clarify the correlation between various means which are elements of the claimed invention and the practical forms employed in the embodiment, practical forms are mentioned in parenthesis which follow the descriptions of means and features of the claimed invention. It is to be understood, however, such practical forms are shown by way of example only and are not intended to limit the scope of the invention.

Figure 10:
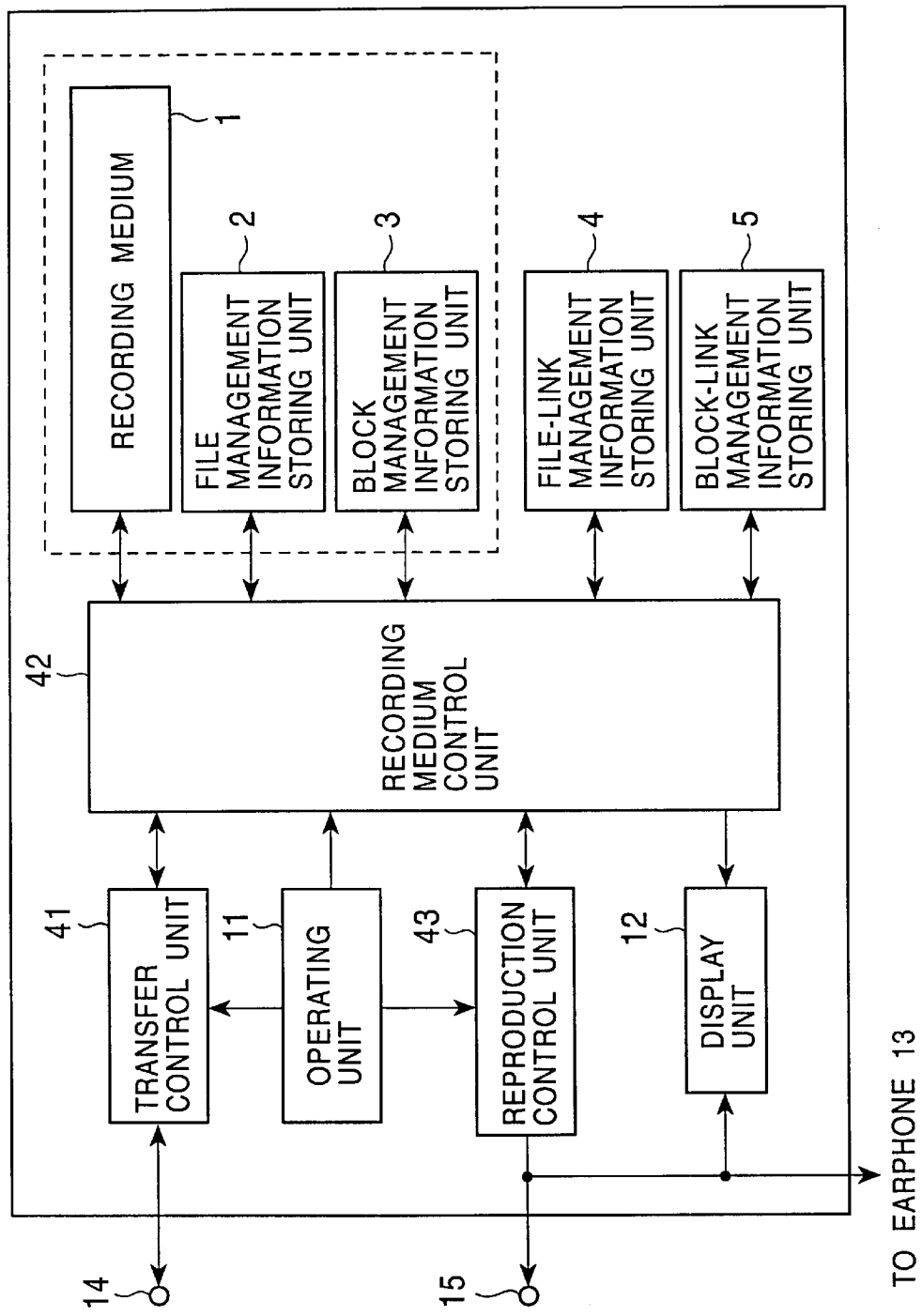
FIG. 10 is a block diagram illustrating an example of the electrical configuration of the user terminal shown in FIG. 4.

In accordance with the first aspect of the present invention, there is provided a recording apparatus for recording data in a recording medium by managing a recording area in the recording medium on a block basis, comprising: file management information storing means (for example, a file management information storing unit 2 shown in FIG. 10) for storing file management information for managing a logical sequential order of each of files stored in the recording medium; block management information storing means (for example, a block management information storing unit 3 shown in FIG. 10) for storing block management information including information for identifying each of the files, information indicative of the logical sequential order of the block in which the data of each file is recorded, and information indicative of the size of the data recorded in the block; and record controlling means (for example, a recording medium control unit 42 shown in FIG. 10) for recording a file in the recording medium and for forming the file administration information and the block management information concerning the file.

The recording apparatus may further comprise parallel block forming means (for example, Step S25 of the program shown in FIG. 13) for forming at least one parallel block constituted by at least one block, for enabling the data of the file to be recorded in at least one block in parallel; wherein the record controlling means records the data of the file in a parallel manner in the block or blocks constituting the parallel block.

The recording apparatus may further comprise changing means (for example, a recording medium control unit 42 shown in FIG. 10) for changing the logical sequence of the files recorded in the recording medium by changing the sequence of the file management information concerning the files stored in the file management information storing means.

The recording apparatus may further comprise erasure means (for example, a recording medium control unit 42 shown in FIG. 10) for erasing the file recorded in the recording medium.

The recording apparatus may further comprise supplying means (for example, a transfer unit 41 shown in FIG. 10) for supplying the record controlling means with the file furnished by an external device.

The reproducing apparatus in accordance with the third aspect comprises: file management information storing means (for example, the file management information storing unit 2 shown in FIG. 10) for storing file management information for managing logical sequential order of each of the files stored in the recording medium; block management information storing means (for example, the block management information storing unit 3 shown in FIG. 10) for storing block management information including information for identifying each of the files, information indicative of the logical sequential order of the block in which the data of each file is recorded, and information indicative of the size of the data recorded in the block; and reproduction controlling means (for example, the recording medium control unit 42 shown in FIG. 10) for reproducing one of the recorded files based on the file administration information and the block management information concerning the file.

The reproducing apparatus may further comprise changing means (for example, the recording medium control unit 42 shown in FIG. 10) for changing the logical sequence of the files recorded in the recording medium by changing the sequence of the file management information concerning the files stored in the file management information storing means.

The reproducing apparatus may also comprise erasure means (for example, the recording medium control unit 42 shown in FIG. 10) for erasing the file recorded in the recording medium.

The reproducing apparatus may also comprise supplying means (for example, the transfer control unit 41 and a reproduction control unit 43 shown in FIG. 10) for supplying an external device with the data of the file reproduced by the reproduction controlling means.

In accordance with the sixth aspect of the invention, there is provided a recording apparatus for recording data of files in a recording medium by managing a recording area in the recording medium on a block basis, comprising: block management information storing means (for example, the block management information storing unit 3 shown in FIG. 10) for storing block management information including information for identifying each of the files, information indicative of the logical sequential order of the block in which the data of each file is recorded, and information indicative of the size of the data recorded in the block; record controlling means (for example, recording medium control unit 42 shown in FIG. 10) for recording a file in the recording medium and for forming the block management information concerning the file; and block link management information forming means (for example, the recording medium control unit 42 shown in FIG. 10) for forming, based on the block management information, block link management information including link information indicative of the state of linkage between the blocks in which the data of the file is recorded.

The recording apparatus may further comprise parallel block forming means (for example, the Step S25 of the program shown in FIG. 13) for forming at least one parallel block constituted by at least one block, for enabling the data of the file to be recorded in at least one block in parallel. In this case, the record controlling means serves to record the data of the file in a parallel manner in the block or blocks constituting the parallel block.

The recording apparatus may further comprise file link management information forming means (for example, the recording medium control unit 42 shown in FIG. 10) for forming, based on the block management information, file link management information which includes information indicative the size of the file and information serving as a pointer for enabling access to the block management information and the block link management information concerning the block or blocks in which the data of the file is recorded.

The recording apparatus also may further comprise file management information storing means (for example, the file management information storing unit 2 shown in FIG. 10) for storing file management information for enabling management of logical sequence of the files stored in the recording medium.

The recording apparatus also may further comprise supplying means (for example, the transfer control unit 41 shown in FIG. 10) for supplying the record controlling means with the file furnished by an external device.

In accordance with the eighth aspect of the invention, there is provided a reproducing apparatus for reproducing data of a file from a recording medium by managing a recording area in the recording medium on a block basis, comprising: block management information storing means (for example, the block management information storing unit 3 shown in FIG. 10) for storing block management information which includes information for identifying each of the files, information indicative of the logical sequential order of the block in which the data of each file is recorded, and information indicative of the size of the data recorded in the block; block link management information forming means (for example, the recording medium control unit 42 shown in FIG. 10) for forming, based on the block management information, block link management information including link information indicative of the state of linkage between the blocks in which the data of the file is recorded; and reproduction controlling means (for example, the recording medium control unit 42 shown in FIG. 10) for reproducing the file based on the block management information and the block link management information.

The reproducing apparatus may further comprising file link management information forming means (for example, the recording medium control unit 42 shown in FIG. 10) for forming, based on the block management information, file link management information which includes information indicative the size of the file and information serving as a pointer for enabling access to the block management information and the block link management information concerning the block or blocks in which the data of the file is recorded.

The reproducing apparatus also may further comprise file management information storing means (for example, the file management information storing unit 2 shown in FIG. 10) for storing file management information for enabling management of logical sequence of the files stored in the recording medium.

In accordance with the eleventh aspect of the invention, there is provided a recording apparatus for recording data of a file in a parallel manner in a recording medium by managing a recording area in the recording medium on a block basis, comprising: parallel block forming means (for example, the Step S25 of the program shown in FIG. 13) for forming at least one parallel block constituted by at least one block, for enabling the data of the file to be recorded in at least one block in the parallel manner; record controlling means (for example, the recording medium control unit 42 shown in FIG. 10) for recording the data of the file in the parallel manner in the block or blocks constituting the parallel block; block link management storing means (for example, a block link management information storing unit 5 shown in FIG. 10) for storing block link management information concerning the parallel block constituted by the block or blocks in which the data of the file is recorded; and computing means (for example, the recording medium control unit 42 shown in FIG. 10) for computing position information concerning the position of the data of the file based on the block link management information.

The recording apparatus may further comprise: block management information storing means (for example, the block management information storing unit 3 shown in FIG. 10) for storing block management information including information for identifying the file, information indicative of the logical sequential order of the block in which the data of each file is recorded, and information indicative of the size of the data recorded in the block; and block link management information forming means (for example, the recording medium control unit 42 shown in FIG. 10) for forming the block link management information based on the block management information.

The recording apparatus may further comprise display means (for example, the display unit 12 shown in FIG. 10) for displaying the position information.

The recording apparatus may further comprise file link management information storing means (for example, a file link management information storing unit 4 shown in FIG. 10) for storing file link management information including information indicative of the size of the file. In this case, the computing means computes the position information concerning the data of the file based on the block link management information and the file link management information.

In this case, the recording apparatus may further comprise file link management information forming means (for example, the recording medium control unit 42 shown in FIG. 10) for forming the file link management information based on the block management information.

In accordance with the thirteenth aspect of the invention, there is provided a reproducing apparatus for reproducing, by managing the recording area of a recording medium on a block basis, data which has been stored in the recording medium in a parallel manner, wherein at least one parallel block constituted by at least one block, for enabling the data of a file to be recorded in at least one block in the parallel manner, has been formed and the data of the file has been recorded in the parallel manner in the bock or blocks constituting the parallel block, the reproducing apparatus comprising: block link management information storing means (for example, the block link management information storing unit 5 shown in FIG. 10) for storing block link management information concerning the parallel block constituted by the block or blocks in which the data of the file is recorded; reproduction controlling means (for example, the recording medium control unit 42 shown in FIG. 10) for reproducing the data of the file based on the block link management information; and computing means (for example, the recording medium control unit 42 shown in FIG. 10) for computing, based on the block link management information, position information concerning the position of the data of the file which is being reproduced.

The reproducing apparatus may further comprise: block management information storing means (for example, the block management information storing unit 3 shown in FIG. 10) for storing block management information including information for identifying the file, information indicative of the logical sequential order of the block in which the data of each file is recorded, and information indicative of the size of the data recorded in the block; and block link management information forming means (for example, the recording medium control unit 42 shown in FIG. 10) for forming the block link management information based on the block management information.

The reproducing apparatus may also further comprise display means (for example, the display unit 12 shown in FIG. 10) for displaying the position information.

The reproducing apparatus may also further comprise file link management information storing means (for example, the file link management information storing unit 4 shown in FIG. 10) for storing file link management information including information indicative of the size of the file. In this case, the computing means computes the position information concerning the data of the file based on the block link management information and the file link management information.

In this case, the reproducing apparatus may further comprise file link management information forming means (for example, the recording medium control unit 42 shown in FIG. 10) for forming the file link management information based on the block management information.

It is to be understood that the units and steps mentioned in the foregoing description of the features of the invention are only illustrative and are not to be understood in a restricting sense.

A description will now be made regarding the parallel recording method to which the present invention is applied. The details of this parallel recording method have already been disclosed in detail in the applications already filed by the present assignee, e.g., Japanese Unexamined Patent Application Publication No. 7-200181 and Japanese Patent Application No. 9-109784, so the details thereof will be described here in brief. Also, the description in Japanese Unexamined Patent Application Publication No. 7-200181 and Japanese Patent Application No. 9-109784 involves a recording medium wherein writing is performed in units called "pages", and deleting is performed in units called "blocks", which are larger units than pages, but the scope of application of the present invention is by no means restricted to such a recording medium. Namely, the present invention can be used for recording mediums whose recording areas are managed on a predetermined unit, e.g., on a predetermined block basis. Thus, the parallel recording method is nothing more than an example of the recording method to which the invention is applicable, and the invention can also be applied to recording method other than the parallel recording method.

Figure 1:
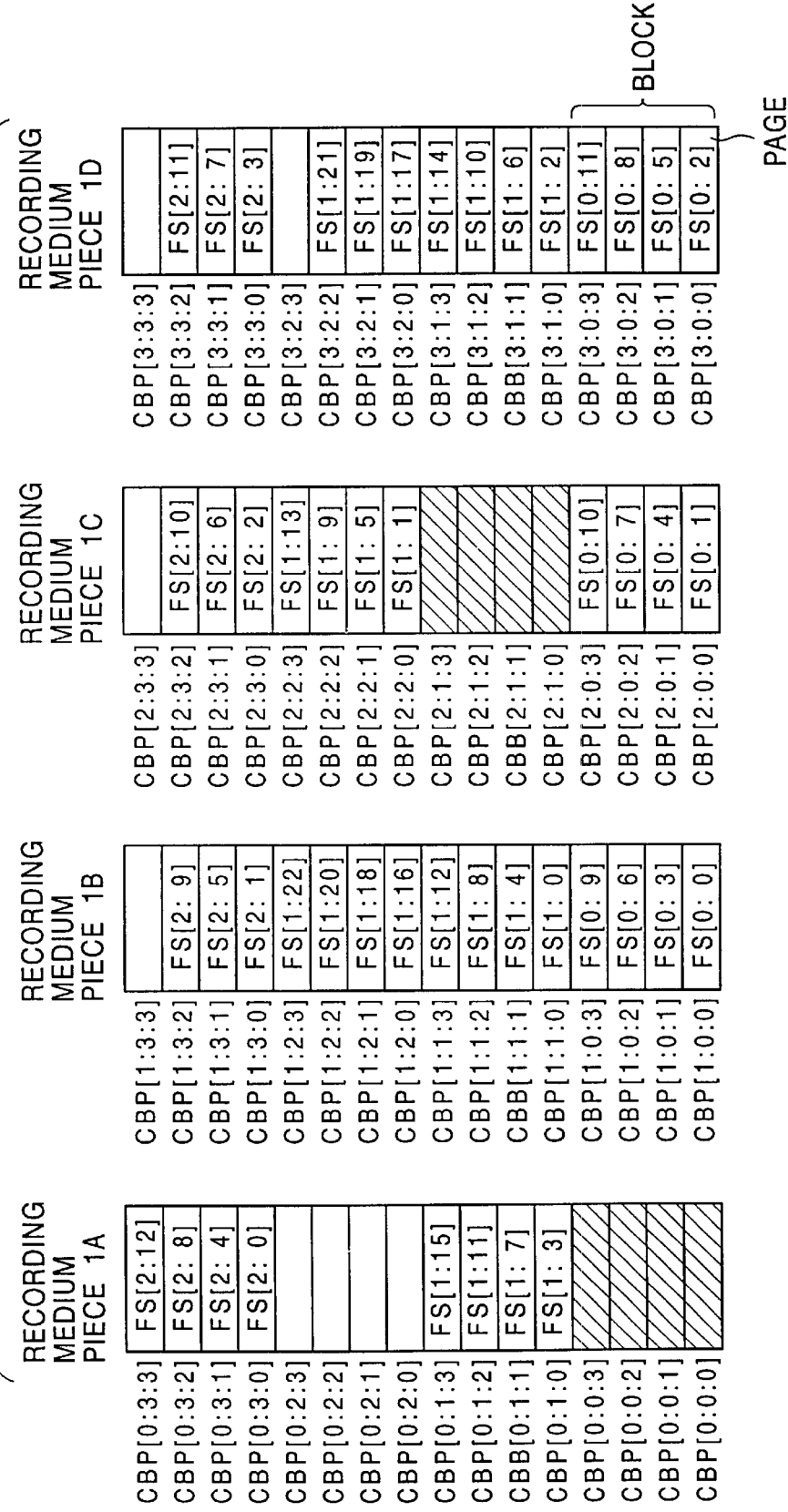
FIG. 1 is a diagram illustrating the recording state of a recording medium 1.

FIG. 1 is a configuration example of a recording medium on which data is written with the parallel recording method.

With the embodiment shown in FIG. 1, the recording medium 1 is configured of four recording medium pieces, 1A through 1D. While each of the recording medium pieces 1A through 1D is equivalent to one memory chip in a basic arrangement, different arrangements may be made wherein the recording area of one recording medium is divided into four recording areas, with each of the recording medium pieces 1A through 1D corresponding to the four recording areas, for example.

For example, the recording medium piece 1A is configured of 16 pages, with each page consisting of 512 bytes. Also, according to the present embodiment, four pages make up one block, so the recording medium piece 1A is configured of four blocks (i.e., 16/4). The other recording medium pieces 1B through 1D are also configured in the same manner.

Now, with the present embodiment, physical addresses on the recording medium 1 are represented as follows.

Here, a physical address is represented using three units, chip No. "c", block No. "b", and page No. "p". The chip no. c is for specifying the recording medium pieces 1A through 1D, with the recording medium pieces 1A through 1D being represented by C[0] through C[3], respectively.

The block No. b is for specifying the blocks in each of the recording medium pieces 1A through 1D; e.g., the first through the fourth blocks from the bottom in each of the recording medium pieces 1A through 1D are respectively represented by B[0] through B[3], for example. Also, the lowest block in the recording medium piece 1A is represented as CB [0:0], using the chip No. c and block No. b. The second from the lowest block in the recording medium piece 1A is represented as CB [0:1], the third from the lowest block in the recording medium piece 1A is represented as CB [0:2], and the highest block is represented as CB [0:3]. In the same way, the first through fourth blocks from the bottom in the recording medium piece 1B are respectively represented as CB [1:0] through CB [1:3], the first through fourth blocks from the bottom in the recording medium piece 1C are respectively represented as CB [2:0] through CB [2:3], and the first through fourth blocks from the bottom in the recording medium piece 1D are respectively represented as CB [3:0] through CB [3:3].

The page no. p is for specifying the pages in each block, the first through the fourth pages from the bottom in each of the blocks respectively represented by P[0] through P[3]. Also, the lowest page in the lowest block in the recording medium piece 1A is represented as CBP [0:0:0], using the chip No. c, block No. b, and page No. p. The second from the lowest page in the lowest block in the recording medium piece 1A is represented as CBP [0:0:1], the third from the lowest page is represented as CBP [0:0:2], and the top page is represented as CBP [0:0:03]. The pages in the other blocks in the recording medium piece 1A, and the pages in the blocks in the recording medium pieces 1B through 1D, are represented in the same manner.

Accordingly, expressing the recording medium pieces 1A through 1D as chips No. 1 through No. 4, the "p"th page from the bottom in the "b"th block from the bottom in the "c"th chip is represented as CBP [c-1:b-1:p-1].

Now, in the present description, one page is defined as being 512 bytes, and the reason is that the size of one page has been set to the same as the capacity of one sector, which is 512 bytes, in order to facilitate ease of correlation with the FAT (File Allocation Table) file system and so forth. It should be noted, however, that the capacity of one page is not restricted to this arrangement.

In FIG. 1, FS [f:s] which is described in the pages of the recording medium pieces 1A through 1D represents the data of files recorded in the recording medium 1, with "f" representing the file No. for specifying the file, and "s" representing the sector No. for specifying the sector. Accordingly, in FIG. 1, data FS [2:12] specified by file No. 2 and sector no. 12, is recorded to the topmost page (i.e., the page with the physical address CBP [0:3:3]) of the recording medium piece 1A, for example. Also, data FS [0:2] specified by file No. 0 and sector no. 2, is recorded to the bottommost page (i.e., the page with the physical address CBP [3:0:0]) of the recording medium piece 1D, for example.

Also, in FIG. 1, the hatched areas (blocks) indicate areas to which data cannot be written at that point (including cases wherein writing is forbidden). In other words, the hatched portions represent blocks which are damaged either from the time of manufacturing or due to excessive rewriting (hereafter also referred to as "invalid blocks"), or blocks which are secured for system area or spare area (hereafter also referred to as "system blocks").

The data recording in the recording medium 1 shown in FIG. 1 is managed in units of files and units of blocks, i.e., on a block basis, as shown in FIG. 2.

That is to say, FIG. 2 illustrates a configuration example of a file management information storing unit 2 for storing file management information for managing data recorded on the recording medium 1 in units of files, and a block management information storing unit 3 for storing block management information for managing data in units of blocks.

In FIG. 2, the file management information storing unit 2 has an entry corresponding with eight physical addresses, M[0] through M[7]. The basic arrangement is such that file management information relating to one file can be stored in one entry, so with the embodiment shown in FIG. 2, file management information relating to up to eight files can be stored (recorded). However, it should be noted that the configuration of the file management information storing unit 2 is by no means restricted to storing file management information relating to for up to eight files; rather, various arrangements may be made wherein the file management information storing unit 2 is capable of storing a different number of pieces of file management information.

The file management information comprises file identification information for specifying (recognizing) the file (e.g., file name), the file size of that file, and a pointer to the entry of block management information stored in the block management information storing unit 3 (i.e., the start entry). With the embodiment shown in FIG. 2, the file name is F[n] (wherein n is a file No. corresponding with the file, for example), the file size is the number of sectors (equal to the number of pages in the present embodiment), and the pointer to the entry is the physical address T[c:b] in the block management information storing unit 3 that is represented using the chip No. c and the block No. b.

Now, in the file management information, the pointer to the entry points the entry of the block management information which manages the block storing the beginning or leading end of the file corresponding to the file managed by the file management information, and will hereafter also be referred to as "start entry".

The following can be recognized, according to the file management information stored in the file management information storing unit 2, as shown in FIG. 2.

Firstly, three files specified with the file names F[0] through F[2] are recorded on the recording medium 1, with the logical order thereof being F[1], F[2], F[0]. Secondly, the sizes of the files F[0] through F[2] are sized equivalent to 12 sectors (pages), 23 sectors, and 13 sectors, respectively. Thirdly, in the recording medium 1, the beginning blocks storing the files F[0] through F[2] are the blocks CB[1:0], CB[1:1], CB[0:3] which correspond to the entries in the block management information storing unit 3, represented respectively with physical addresses of T[1:0], T[1:1], and T[0:3].

Incidentally, in the file management information storing unit 2 (and in the block management information storing unit 3 as well), the portions described with a hyphen (–) indicate invalid file management information (that there is no valid file management information).

Next, the block management information storing unit 3 has entries corresponding to the blocks of the recording medium 1 (FIG. 1), i.e., a total of 16 blocks comprised of the four blocks each of the recording medium pieces 1A through 1D, and block management information of each corresponding block is stored in each entry.

Now, the physical addressees of the entries making up the block management information storing unit 3 are represented as T[c:b], using the chip No. c of the recording medium pieces 1A through 1D having the block corresponding with the entry, and the block No. b of the corresponding block. Accordingly, in the block management information storing unit 3, the entry represented with a physical address T[c:b] stores (has been recorded with) block management information regarding a block CB[c:b] with a chip No. of the recording medium pieces 1A through 1D of c, and a block No. b.

More specifically, for example, an entry represented with a physical address of T[0:0] stores block management information regarding the lowest block (B[0]) in the recording medium piece 1A (C[0]). Also, an entry represented with a physical address of T[0:1] stores block management information regarding the block second from the bottom (B[1]) in the recording medium piece 1A (C[0]). Further, an entry represented with a physical address of T[0:2] stores block management information regarding the block third from the bottom (B[2]) in the recording medium piece 1A (C[0]), and an entry represented with a physical address of T[0:3] stores block management information regarding the fourth block from the bottom, which is the top block (B[3]) in the recording medium piece 1A (C[0]). In the same way, each entry stores block management information regarding corresponding blocks, so the highest entry in the block management information storing unit 3, i.e., an entry represented with a physical address of T[3:3] stores block management information regarding the top block (B[3]) in the recording medium piece 1D (C[3]).

Incidentally, a table comprised of all of the block management information in the block management information storing unit 3 is called a BAT (Block Allocation Table), and the entries of the block management information storing unit 3 making up the BAT are referred to as "BAT entries".

The block management information for each BAT entry is made up of necessary status flags, link information, etc.

Six status flags have been provided here; the invalid flag, system flag, first flag, next flag, last flag, and loop flag. The invalid flag indicates that the corresponding block is an invalid block. The system flag indicates that the corresponding block is a system block. The first or last flag indicates that the corresponding block is a block wherein the beginning or ending of a file is recorded, and the next flag indicates that data continuing from the data recorded in the corresponding block exists (i.e., that there is data continuing from the data recorded in the corresponding block recorded in another block). The loop flag indicates that the last of the data making up the later-described parallel block is recorded in the corresponding block (i.e., that the corresponding block is the last block making up the parallel block). The loop flag indicates that the block carrying this flag is the last one of the blocks constituting the parallel block.

In FIG. 2, the invalid flag, system flag, loop flag, first flag, next flag, and last flag, have been appropriated to the first through 6th bits of the block management information. Also, in FIG. 2, the numeric values 0 and 1 indicating status flags represent whether or not the status flag has been raised (here, for example, a value of 1 indicates that the status flag has been raised).

Now, in the event that a block is not indicated in the block management information by any of a first flag, next flag, or last flag (i.e., all are 0), this indicates that the corresponding block can be written to (i.e., an available block, which includes cases wherein some sort of data has been written to that block but can be written over). Accordingly, available blocks can be detected by making reference to the first flag, next flag, and last flag.

The link information (next entry) represents the linkage state between the blocks configuring the recording medium pieces 1A through 1D. That is, the physical address of the BAT entry corresponding to the block where the data continuing from the data recorded in a certain block is recorded, is used as the link information. Accordingly, the link information is recorded in the event that a block exists to which the data continuing from the data recording in the block corresponding to the BAT entry recording the link information is recorded, so this is recorded along either the first flag or next flag (i.e., the link information is recorded in the event that either the first flag or next flag is set to 1).

In the embodiment shown in FIG. 2, the physical address [2:0] of the BAT entry corresponding to the block CB[2:0] is written as link information to the BAT entry T[1:0] corresponding to the block CB[1:0]. Also, the physical address [3:0] of the BAT entry corresponding to the block CB[3:0] is written as link information to the BAT entry T[2:0].

Further, a first flag, next flag, and last flag are respectively stored as status flags for the BAT entries T[1:0], T[2:0], and T[3:0] (i.e., the values thereof are set to 1), and the continuous data of a file is recorded in a parallel manner in the blocks CB[1:0], CB[2:0], and CB[3:0] in that order. Further, the beginning or end data of the file is recorded in the block CB[1:0] or CB[3:0], so it can be understood that the data comprised of these three blocks consist of one file.

Also, in FIG. 2, the pointer to the BAT entry T[1:0] wherein the first flag is stored, is stored in the entry M[2] in the file management information storing unit 2, and accordingly, the file comprised of the data stored in the blocks CB[1:0], CB[2:0], and CB[3:0] is managed as a third file F[0] in the file management information storing unit 2.

According to file management information and block management information such as described above, the recorded state of a file in the recording medium 1 can be recognized as follows.

That is, taking note of file F[1], the logical order of the file F[1] is recorded as the 1st in order by the file management information, and further, it can be recognized that the size thereof is 23 sectors worth. Further, regarding the file F[1], the state of recording in the recording medium 1 can be recognized by making reference to the block management information recorded in the BAT entry group linked from the BAT entry T[1:1].

Then, T[2:2] is recorded to the BAT entry T[1:1] as link information, so it can be understood that the BAT entry T[1:1] is linked to the BAT entry T[2:2]. Further, T[3:1] is recorded to the BAT entry T[2:2] as link information, T[0:1] is recorded to the BAT entry T[3:1] as link information, T[1:2] is recorded to the BAT entry T[0:1] as link information, T[3:2] is recorded to the BAT entry T[1:2] as link information, so it can be understood that the linkage is in the order to BAT entry T[1:1], T[2:2], T[3:1], T[0:1], T[1:2], and T[3:2], and accordingly, the data of the file F[1] is recorded in the order of block CB[1:1], CB[2:2], CB[3:1], CB[0:1], CB[1:2], and CB[3:2].

Further, a first flag is recorded to the BAT entry T[1:1], so it can be understood that the beginning data of the file F[1] is recorded to the block CB[1:1] corresponding to the BAT entry T[1:1]. Also, a next flag is recorded for the BAT entry T[2:2] linked to the BAT entry T[1:1], a next flag is recorded for the BAT entry T[3:1] linked thereto, and a next flag and loop flag are recorded for the BAT entry T[0:1] linked thereto. Accordingly, it can be understood that the data of the file F[1] is recorded in a parallel manner to the blocks CB[1:1], CB[2:2], CB[3:1], and CB[0:1], respectively corresponding to the BAT entries T[1:1], T[2:2], T[3:1], and T[0:1], i.e., that the four blocks CB[1:1], CB[2:2], CB[3:1], and CB[0:1] comprise a parallel block.

Also, a next flag is recorded for the BAT entry T[1:2] linked to the BAT entry T[0:1], and a last flag is recorded to the BAT entry T[3:2] linked thereto, so the data of the file F[1] is also recorded in a parallel manner in the blocks CB[1:2] and CB[3:2]corresponding to the BAT entries T[1:2]and T[3:2]. That is, it can be understood that the two blocks CB[1:2] and CB[3:2] comprise a parallel block. Further, it can be understood that the last data of the file F[1] is recorded in the block CB[3:2] corresponding to the BAT entry T[3:2] where the last flag is recorded.

Accordingly, though not described above, in the event that the physical address of a BAT entry is recorded along with a first flag, this not only indicates that there is the beginning data of the file recorded in the block corresponding to the BAT entry where the first flag is recorded, but also indicates that there is subsequent data. Also, a last flag not only indicates that there is the last data of the file recorded in the block corresponding to the BAT entry where the last flag is recorded, but also indicates that the block is the last block in the parallel block.

As described above, of the file management information, the start entry indicates the BAT entry storing the block management information for managing the block where the beginning data of the file managed by the file management information is recorded. Then, following the block management information with reference to the link information contained therein allows the block wherein the file is recorded to be recognized. Next, with the parallel recording method, first, one block each is selected from one or more of the recording medium pieces 1A through 1D (basically, a plurality), and these blocks comprise one parallel block. That is, parallel blocks which are the unit for recording data in a parallel manner are thus formed.

Now, in order to simplify the description, let us say that one block is selected from each of the recording medium pieces 1A through 1D, e.g., the recording medium pieces 1A through 1D shown in FIG. 1, and that blocks CB[0:1], CB[1:1], CB[2:2], and CB[3:1], for example are extracted, thereby forming a parallel block with these four blocks. Then, data is written in a parallel manner, to the object comprised of the blocks CB[0:1], CB[1:1], CB[2:2], and CB[3:1] making up the parallel block.

More specifically, assuming that the file to be recorded is the file F[1], the No. 1 sector (first sector) FS[1:0] of the file F[1] is written into, for example, the recording medium piece 1B, more particularly in the block CB[1:1] constituting the parallel block (see FIG. 1). The writing of data into the recording medium 1 is performed on page basis, as described before. Therefore, the first sector FS[1:0] is written in the bottom or lowest page, i.e., in the page CBP[1:1:0], of the block CB[1:1].

After the No. 1 sector F[1:0] of the file F[1] is input to the recording medium piece 1B, the subsequent No. 2 sector FS[1:1] (second sector) thereof is input to the recording medium piece 1C, for example, and is written to the block CB[2:2] therein making up the parallel block (FIG. 1). Incidentally, as described above, the No. 2 sector FS[1:1] is written to the lowest page in the block CB[2:2] for example, i.e., the page CBP[2:2:0].

After the No. 2 sector FS[1:1] of the file F[1] is input to the recording medium piece 1C, the subsequent No. 3 sector FS[1:2] thereof is input to the recording medium piece 1D, for example, and is written to the block CB[3:1] therein making up the parallel block (FIG. 1). Incidentally, in this case also, the No. 3 sector FS[1:2] is written to the lowest page in the block CB[3:1] for example, i.e., the page CBP[3:1:0].

After the No. 3 sector FS[1:2] of the file F[1] is input to the recording medium piece 1D, the subsequent No. 4 sector FS[1:3] thereof is input to the recording medium piece 1A, for example, and is written to the block CB[0:1] therein making up the parallel block (FIG. 1). In this case also, the No. 4 sector FS[1:3] is written to the lowest page in the block CB[0:1] for example, i.e., the page CBP[0:1:0].

After the No. 4 sector F[1:3] of the file F[1] is input to the recording medium piece 1A, the subsequent No. 5 sector FS[1:4] thereof is input to the recording medium piece 1B again, and is written to the block CB[1:1] therein making up the parallel block (FIG. 1). Incidentally, in this case, the No. 5 sector FS[1:4] is written to the second lowest page in the block CB[1:1], i.e., the page CBP[1:1:1], because the first sector FS[1:0] has been already stored in the lowest page CBP[1:1:0] of the block CB[1:1].

Subsequently, in the same manner, the file F[1] is written in units of pages to the blocks CB[0:1], CB[1:1], CB[2:2], and CB[3:1] making up the parallel block, in an interleaved manner. Incidentally, in the event that the amount of data in the file F[1] exceeds four blocks worth, first, the writing to the blocks CB[0:1], CB[1:1], CB[2:2], and CB[3:1] is completed, following which the remaining data (remaining sectors) is written to a parallel block comprised of other blocks.

According to such a parallel recording method, the waiting time which occurs in the event that the recording medium 1 is comprised of flash memory or the like which has relatively long program time as compared to the data input time as described above, can be done away with or at least reduced.

For example, let us represent the data input time for the recording medium pieces 1A through 1D as $t_{input}$, and the program time thereof as $t_{prog}$. In the example that data is to be written to only the recording medium piece 1A, for example, of the recording medium pieces 1A through 1D without interleaving, as shown in FIG. 3A, the No. 1 sector is input to the recording medium piece 1A (C[0]) at time t0 followed by the data input time $t_{input}$ elapsing, thereby completing the input at the time t1. Subsequently, the writing of the No. 1 sector for which input has been completed is initiated, and the writing is completed at a time t4' following elapsing of the program time $t_{prog}$. Then, input of the No. 2 sector to the recording medium piece 1A (C[0]) is initiated, thus writing data to the recording medium piece 1A in the same manner.

As described above, in the event of writing data without interleaving, there is the need to wait for the program time $t_{prog}$ to elapse following completing of the data input, before beginning the next input of data. Accordingly, the totaled time of the data input time $t_{input}$ and the program time $t_{prog}$ is required for writing one sector, so in the event that six pages of data are to be written without interleaving for example, as shown in FIG. 3A, an amount of time consisting of the time required to write one sector multiplied by six, i.e., Ts $(=6\times(t_{input}+t_{prog}))$ is required.

On the other hand, with the arrangement described above wherein blocks are selected from each of the recording medium pieces 1A through 1D (C[0] through C[3]), forming a parallel block with these extracted four blocks, to which data is written in an interleaved manner in the order of the recording medium pieces 1A, 1B, 1C, and 1D, the No. 1 sector is input to the recording medium piece 1A (C[0]) at time t0, as shown in FIG. 3B, and the input is completed at a time t1 following elapsing of the data input time $t_{input}$. Then, the writing of the No. 1 sector for which input has been completed is initiated, and the writing is completed at a time t4' following elapsing of the program time $t_{prog}$. This point is the same as the arrangement shown in FIG. 3A.

However, the input of the No. 2 sector to the recording medium piece 1B (C[1]) can be initiated as soon as the input of the No. 1 sector to the recording medium piece 1A is completed, and consequently, the input of the No. 2 sector to the recording medium piece 1B is started at time t1. Subsequently, the input is completed at a time t2 following elapsing of the data input time $t_{input}$, and the writing is completed to the recording medium piece 1B following elapsing of the program time $t_{prog}$.

In the same way, the input of the No. 3 sector to the recording medium piece 1C (C[2]) can be initiated at the time t2 when the input of the No. 2 sector to the recording medium piece 1B is completed, and further, the input of the No. 4 sector to the recording medium piece 1D (C[3]) can be initiated at the time t3 following elapsing of the data input time $t_{input}$ from the time t2 when the input of the No. 3 sector is started.

Then, in the event that the program time $t_{prog}$ is slightly shorter than three times the duration of the data input time $t_{input}$, as shown in FIG. 3B, the time t4 which is a time at which the data input time $t_{input}$ has elapsed from the time t3 at which the input of the No. 4 sector began, i.e., the time t4 at which the input of the No. 4 sector is completed in the recording medium piece 1A (C[0]), is a time occurring after the time t4' at which the writing of the No. 1 sector is completed, so the input of the No. 5 sector to the recording medium piece 1A (C[0]) can be initiated from the time t4 at which the input of the No. 4 sector to the recording medium piece 1D is completed. In the same way, the input of the No. 6 sector to the recording medium piece 1B (C[1]) can be initiated at the time t5 (a time at which the data input time $t_{input}$ has elapsed from the time t4) when the input of the No. 5 sector to the recording medium piece 1A is completed.

Accordingly, in the case of writing data while interleaving, the amount of wait time owing to the program time $t_{prog}$ is zero in the embodiment shown in FIG. 3, and as a result, the writing of 6 pages of data can be conducted within a time Tp ($=6 \times t_{input}+t_{prog}$), which is shorter than the time Ts which is the time required to write the same data without interleaving. That is to say, according to the parallel recording method, even in the event that the program time of the recording medium 1 is relatively long compared to the data input time, the data can be written at high speeds.

The above-described FIGS. 1 and 2 illustrate the recording medium 1 to which the data is written by the above parallel recording method, and the file management information storing unit 2 and block management information storing unit 3. The data stored thus may be read as follows.

For example, in the event of reading a file F[0], the file management information of the file F[0] can be recognized by making reference to the file management information storing unit 2 (FIG. 2). Then, the physical address of the BAT entry managing the block where the beginning data of the corresponding file is stored, i.e., T[1:0] in the embodiment in FIG. 2, is recognized based on the file management information of the file F[0].

As described above, the BAT entry T[1:0] is for managing the block CB[1:0], but the block management information storing unit 3 stores the physical address T[2:0] of the BAT entry corresponding to the block CB[2:0] as link information in the BAT entry T[1:0] corresponding to the block CB[1:0]. Also, the physical address T[3:0] of the BAT entry corresponding to the block CB[3:0] is stored as link information in the BAT entry T[2:0].

Further, a first flag, next flag, and last flag are respectively stored as status flags to the BAT entries T[1:0], T[2:0], and T[3:0], and based on the above, recognition can be made that the data of the physical file corresponding to the logical file F[0] has been stored in a parallel manner while interleaving to the parallel block comprised of blocks CB[1:0], CB[2:0], and CB[3:0], in that order. Once the parallel block and the order by which the data of the physical file has been written to the blocks making up the parallel block have been recognized, the data is read out of the parallel block in an interleaved (de-interleaved) manner in the same order in which it was written. That is, in this case, the data is read out from the lowest page in the first block CB[1:0] making up the parallel block, following which the data is read out from the lowest page in the second block CB[2:0] making up the parallel block, and finally the data is read out from the lowest page in the last block CB[3:0] making up the parallel block. Following the data being read out from the lowest page in the last block CB[3:0] making up the parallel block, the processing returns to the first block CB[1:0] making up the parallel block, where the data is read out from the second lowest page therein, and so on, thereby reading the data in a parallel manner from the blocks making up the parallel block.

Then, at the point that the 12 pages of data which is the file size of the logical file F[0] stored in the file management information has been completely read, i.e., in this case, at the point of completing reading of data from the last page (the fourth page from the bottom) of the last block CB[3:0] making up the parallel block, namely the page CBP[3:0:3], the process is completed, as all data of the logical file F[0] has been read.

In the embodiment described before in connection with FIG. 2, as stated above, the file management information has a file name, file size and a start entry, while the block management information has status flags and link information concerning the corresponding blocks. When making an access to a file, a reference is made to the file management information so that the start entry of the file to be accessed is recognized. Then, a reference is made to the block management information stored in the BAT entry designated by the recognized start entry. Then, the link information contained in the block management information are successively chased, whereby the block recording the data of the file to be accessed is recognized.

Therefore, in order to make access to a file, it is necessary that both the file management information and the block management information are available. Therefore, destruction of the file management information due to, for example, a trouble such as a reduction in the voltage of the power supply to the apparatus makes it difficult to access the data of a file, even if the data of the file and the block management information managing the block storing the data are sound.

More specifically, if the block management information is alive and available, it is not impossible to reproduce the data of the file by assembling pieces of data that have been parallel-recorded. This can be achieved by recognizing the state of linkage between the blocks storing such pieces of data, through chasing the link information contained in the block management information that are alive and valid. In the embodiment shown in FIG. 1, however, it is impossible to recognize to what file the reproduced data belongs, unless the file management information is available.

Figure 4:
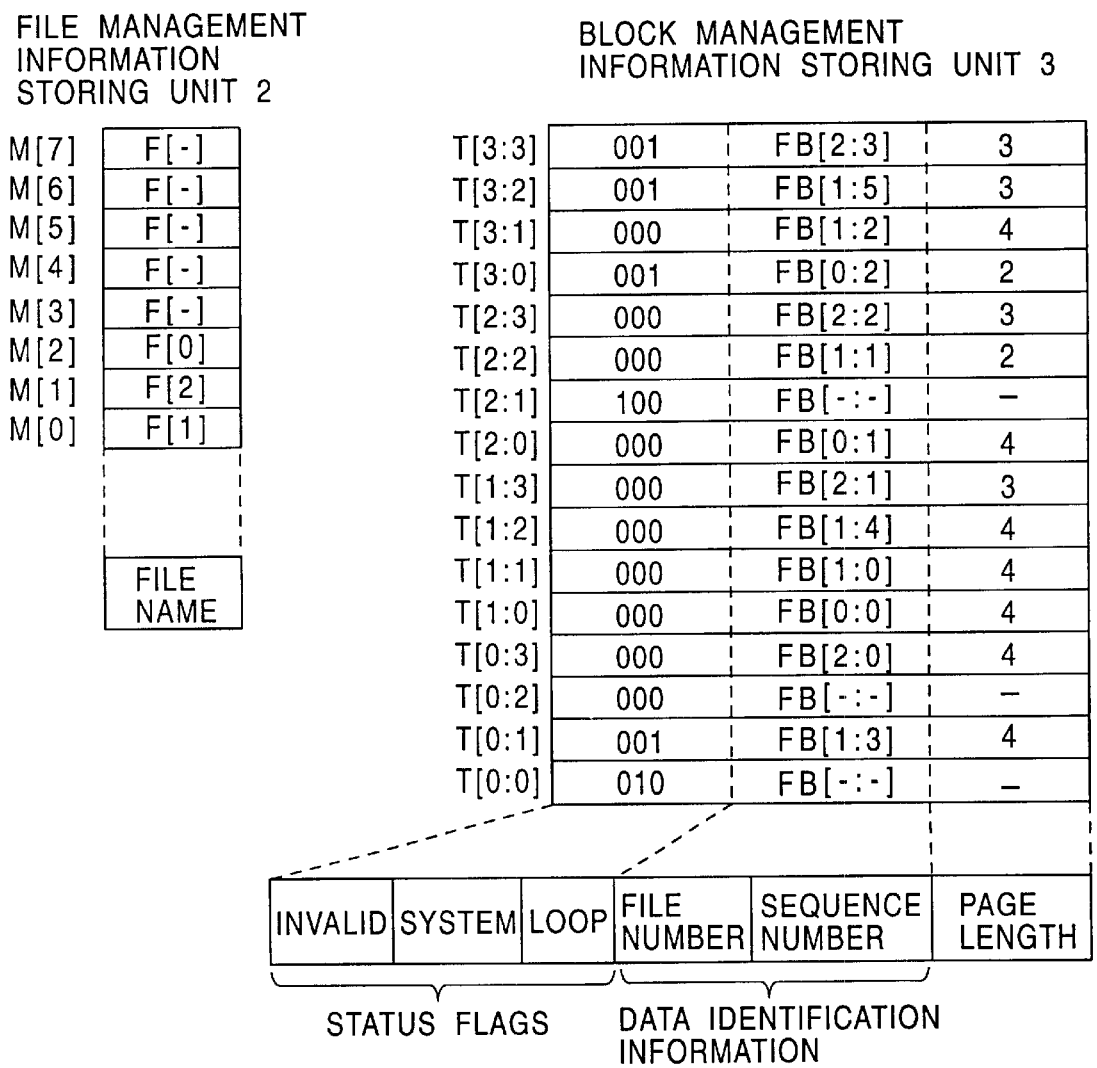
FIG. 4 is a diagram showing structures of new file management information and block management information.

In this embodiment, therefore, the file management information or the block management information as shown in FIG. 4 is stored in the file management storing unit 2 or a block management information storing unit 3, for the purpose of managing the data stored in the recording medium 1. The file management information and the block management information as shown in FIG. 4 are intended to manage the recording medium 1 in which the data has been stored in the manner shown in FIG. 1, as in the case of the embodiment shown in FIG. 2. The file management storing unit 2 and the block management information storing unit 3 have the same entry structure, i.e., the number of entries, blocks managed by the BAT entry, etc., as that in the embodiment shown in FIG. 2. Detailed description, therefore, is omitted in regard to the entry structure.

In the embodiment shown in FIG. 4, the file management information is constituted solely by the file name F[n]. Meanwhile, the block management information includes: three kinds of status flags: namely, the invalid flag, system flag and the loop flag, among various flags; a file number "n" for enabling identification of the file recorded in the block, the number "n" being the same as the number "n" of the file name F[n]; a sequence number "s" which indicates the logical sequential order of the block under the block management information among the blocks storing the data of the file identified by the file number "n"; and the page length indicative of the size of the data in terms of the number of pages recorded in the block. As shown in FIG. 1, it is assumed that one block is composed of four pages.

In the embodiment shown in FIG. 4, the file number "n" and the sequential order number "s" are collectively represented as FB[n:s] which will be referred to as "data identification information", hereinafter. It is to be understood that the sequential order number "s" means that the block under the block management information is the one in which the data was recorded in the (s+1)-th time of writing, among the blocks storing data of the file identified by the number "n".

The file management information shown in FIG. 4 therefore permits recognition of the name and the logical sequence of the file stored in the recording medium 1. More specifically, the file management information shown in FIG. 4 indicates that three files identified by F[0], F[1] and F[2] have been recorded in such a logical sequence that F[1] comes first followed by F[2] which in turn is followed by F[0].

On the other hand, the block management information shown in FIG. 4 permits recognition of the status of the block under the block management information, i.e., whether the block is an invalid block, system block or the last one of the blocks constituting the parallel block, the file number "n" identifying the file the data of which has been stored in this block, the sequential order number "s" of the bock, and the page length.

For instance, block management information [000FB[0:0]4] of the BAT entry T[1:0] indicates that the block CB[1:0] under this block management information is not any of an invalid block, system block and the final block of the parallel block. This block information also indicates that the block CB[1:0] is the block which is the one in which the data was written in the first writing time ("s" being zero, so that S+1 is 1) among the blocks that store the data of the file identified by the file number "0", and that the size of the data written in this block CB[1:0] amounts to 4 pages. Thus, all the pages constituting the block CB[1:0] carries data, since the block is composed of four pages.

Likewise, block management information [001FB[0:2]4] of the BAT entry T[3:0] indicates that the block CB[3:0] under this block management information is the final block of the parallel block. This block information also indicates that the block CB[3:0] is the block which is the one in which the data was written in the third writing time ("s" being 2, so that S+1 is 3) among the blocks that store the data of the file identified by the file number "0", and that the size of the data written in this block CB[3:0] amounts to 4 pages.

In the embodiment shown in FIG. 4, the block management information of the entry T[0:2] shows that all the flags are 0, and both the file number and the sequence number are invalid (FB[-:-]). The page length also is invalid (-). This means that the block CB[0:2] is an empty block.

Thus, in the embodiment shown in FIG. 4, the block management information contains the loop flags, file number "n", sequential order number "s" and the page length. Therefore, it is possible to reproduce the original unitary data by assembling parallel-recorded segments of the data and to recognize to what file the reproduced data belongs, even if the file management information is lost, provided that the block management information is sound and available.

It is also possible to form the file name F[n], i.e., to form the file management information, based on the file number "n". It is to be understood, however, the logical sequence of the files stored in the recording medium 1 cannot be recovered, if the file management information is lost. More specifically, although it is possible to recognize that the recording medium stores three files F[0]. F[1] and F[2], it is impossible to recognize that these files have been recorded in the logical sequence of F[1], F[2] and F[0]. In general, however, the logical sequence of the files recorded in the recording medium 1 is not so critical. In addition, if the user remembers the logical sequence, the logical sequence can be recovered simply by changing the entry of the file management information storing unit 2 in which the reproduced file name F[n] as the recovered file management information is to be stored. It is therefore considered that the impossibility of recognition of the logical sequence of the files does not cause any serious problem.

For instance, change of the entry for enabling storage of the file management information can be achieved as follows. It is assumed here that the file names F[0] to F[2] as the file management information have been recognized and stored in the entries M[0] to M[2], respectively, of the file management information storing unit 2. The user can perform an operation such that the file names F[0], F[1] and F[2] are allocated to the entries M[2], M[0] and M[1], respectively, whereby the sequence of the file names F[0] to F[2] are rearranged into the original sequence of F[1], F[2], F[0] in the file management information storing unit 2. The change of the sequence (order) of the file names as the file management: information stored in the file management information storing unit 2 is effected by a recording medium control unit 42 which will be described later in connection with FIG. 10.

The file management information and the block management information shown in FIG. 4 provide the same information as that provided by the file management information and the block management information described before in connection with FIG. 2 and, hence, enables access to the data stored in the recording medium 1, by the same procedure as that described before in connection with FIG. 2.

More specifically, when making access to the data stored in the recording medium 1, a reference is made to the file management information which causes the file names F[1], F[2] and F[0] to be displayed in this order. If the user appoints the file name F[1] as the file which is to be accessed, retrieval is performed to seek for the pieces of block management information which carries the file number "1". The searched pieces of block management information are then rearranged in accordance with the sequential order number "s". At the same time, the parallel block is recognized based on the loop flags, and the file size (amount of data) of the file F[1] is recognized based on the page length. The file F[1] is therefore read from the recording medium 1 based on the information thus obtained.

The combination of the file management information and the block management information of FIG. 4 alone can provide satisfactory management of the data recorded in the recording medium 1.

The above-mentioned combination alone, however, may require computation based on these two kinds of information, in order to obtain information necessary for making access to the data. Consequently, the access to the data may be delayed by the time required for the computation. In addition, the above-mentioned combination alone may impede quick response to demands posed by various applications.

In this embodiment, therefore, file link management information and block link management information are formed as auxiliary information which assist the file management information and the block management information, respectively. Thus, a file is managed by a combination of the file management information and the file link management information, while a block is managed by a combination of the block management information and the block link management information.

Figure 5:
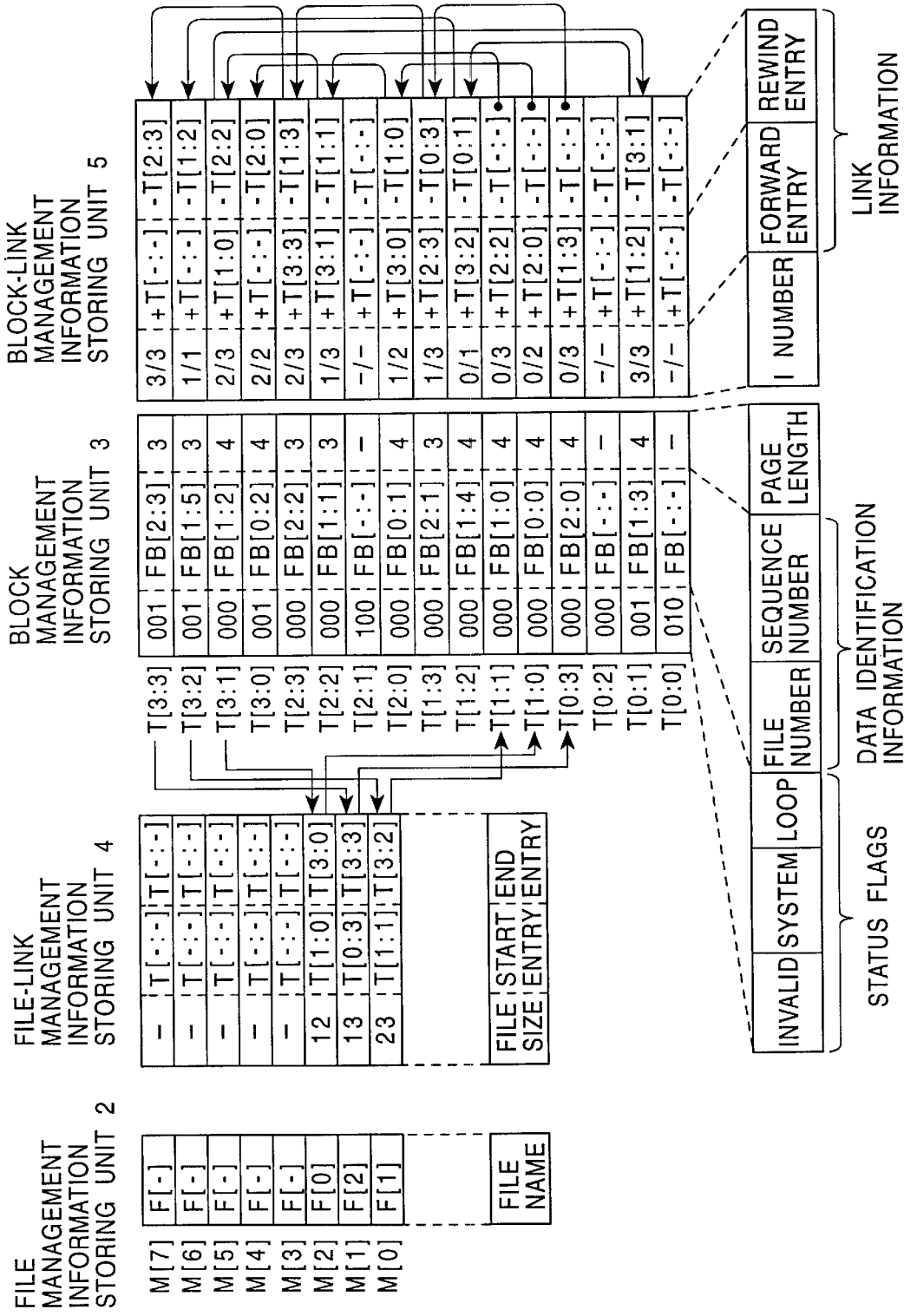
FIG. 5 is a diagram showing structures of file link management information and block link management information.

FIG. 5 shows, by way of example, the structures of a file link management information storing unit 4 and a block link management information storing unit 5 which store the file link management information and the block link management information, respectively, when the data has been stored in the manner shown in FIG. 1. FIG. 5 also shows the file management information storing unit 2 and the block management information storing unit 3 which are shown in FIG. 4.

The file link management information storing unit 4 has the same number of entries as that of the file management information storing unit 2. Each entry stores file link management information which serves as an auxiliary information assisting the file management information stored in the corresponding entry of the file management information storing unit 2.

In this case, the file link management information includes the size of the file identified by the corresponding file management information, i.e., the file name, and a pointer (start entry and end entry) for making access to the BAT entry which stores block management information in the block management storing unit 3.

Referring to FIG. 5, the file size is expressed by the number of pages, i.e., the number of sectors, as in the case of the embodiment shown in FIG. 2. The pointer to the BAT entry is constituted by a start entry and an end entry. As in the embodiment shown in FIG. 2, the start entry is the BAT entry that stores the block management information which manages the leading end (initial) block of the block sequence storing the file, while the end entry is the BAT entry which stores the block management information for managing the trailing end (last) block of the block sequence which stores the file.

For instance, the file F[0] whose file management information is stored in the entry M[2] of the file management information storing unit 2 has the file link management information [12T[1:0]T[3:0]] from which it is understood that the fixe size amounts to 12 pages. Further, the leading end block and the trailing end block of the block sequence storing the file F[0] in the recording medium are managed by the block management information stored in the BAT entry T[1:0] and the block management information stored in the BAT entry T[3:0]. It is therefore understood that the blocks CB[1:0] and CB[3:0] are the leading end block and the trailing end block of the bock sequence that stores the file F[0].

Meanwhile, the block link management information storing unit 5 has the same number of entries as the block management information storing unit 3. Each entry of the block link management information storing unit 5 (this entry is also referred to as "BAT entry", for the sake of convenience in the explanation) stores bock link management information which serves as auxiliary information assisting the block management information stored in the corresponding entry of the block management information storing unit 3.

The block management information includes an I number (Interleave Block Number) concerning the block managed by the corresponding block management information and link information (forward entry and rewind entry).

The I number constitutes information concerning the parallel block which includes the block as the component block. An expression "a/b" indicates that the parallel block is composed of (b+1) blocks and the block designated by the I number is the (a+1)-th block among the blocks constituting the parallel block. The factor "a" will be referred to also as an "block sequential number in parallel block". Similarly, the factor "b" will be referred to also as a "number of component blocks".

The link information is constituted by the forward entry and the rewind entry. The forward entry indicates the state of the forward linkage of the blocks storing data of the same file, as in the case of the link information (next entry) explained before in connection with FIG. 2. Thus, the forward entry designates the BAT entry which stores the block management information (and block link management information) managing the block next to the block carrying the link information in the block sequence storing the file. In contrast, the rewind entry indicates the state of the backward linkage of the blocks storing data of the same file. Thus, the backward entry designates the BAT entry which stores the block management information (and block link management information) managing the block immediately preceding the block carrying the link information in the block sequence. In FIG. 5, the forward entry and the rewind entry are expressed by a "+" and "−" signs, respectively, attached to the physical address of the BAT entry T[c:b]. Thus, the forward and rewind entries are expressed as +T[c:b] and −T[c:b], respectively.

The following states of linkage can be recognized from the block link management information.

For instance, the forward entry of the entry T[1:0] is +[2:0] and the forward entry of T[2:0] is +T[3:0]. This means that the blocks CB[1:0], CB[2:0]and CB[3:0] are linked in this order. This sequence is confirmed also from the fact that the rewind entry of the entry T[3:0] is −T[2:0], and the entry of T[2:0] is −T[1:0].

The rewind entry of the entry T[1:0] and the forward entry of the entry T[3:0] are invalid (−T[-:-], +T[-:-]. This means that no block precedes the block CB[1:0] and no block follows the blocks CB[3:0]. it is therefore understood that the data of a single file is recorded in a parallel manner in and over three blocks CB[1:0], CB[2:0]and CB[3:0]. As described before, it is understood from the file management information and the file link management information that the leading end block and the trailing end block of the block sequence storing the file F[0] are the blocks CB[1:0] and the block CB[3:0]. It is therefore recognized that the single file recorded in the three blocks CB[1:0], CB[2:0]and CB[3:0] is the file F[0].

The blocks CB[1:0], CB[2:0]and CB[3:0] storing the data of the file F[0] are linked forwardly in the mentioned order. The loop flag is set high in the block management information managing the block CB[3:0] among these three blocks (block management information of the entry T[3:0]). This means that these three blocks CB[1:0], CB[2:0]and CB[3:0] form a parallel block.

The I numbers of the three blocks CB[1:0], CB[2:0]and CB[3:0], i.e., the I numbers of the block link management information stored in the entries T[1:0], T[2:0] and T[3:0], are 0/2, 1/2 and 2/2, respectively. This means that the blocks CB[1:0], CB[2:0]and CB[3:0] are the first, second and third blocks of the parallel block constituted by three blocks.

In this embodiment, the block link management information includes not only the forward entry but also the rewind entry. This permits easy recognition of the state of linkage of the blocks in the backward direction, as well as the linkage in the forward direction. In the embodiment shown in FIG. 2, since the rewind entry is not managed, recognition of linkage of a block in the backward direction may necessitate, in the worst case, the retrieval block management information on all the blocks. In contrast, in the embodiment shown in FIG. 4 permits the recognition of the backward linkage, simply by making reference to the rewind entry contained in the block link management information.

Thus, the block which is linked to a block forwardly and the block linked to the same block backwardly can easily be recognized, enabling efficient control of special reproducing operations such as fast reproduction and rewinding or backward reproduction.

As stated above, the file link management information contains both the start entry and the end entry, permitting easy recognition of the leading end block and the trailing end block of the file. Consequently, efficient control of special reproducing operations such as the fast reproduction and backward reproduction can achieved also in regard to the inter-file transition.

The file size contained in the file link management information and the I number contained in the block link information permits, by themselves or with the assist of other necessary information, an easy computation of the temporal position, i.e., the position information, of the file data.

For instance, it is assumed here that the files stored in the recording medium 1 are sequentially reproduced in accordance with the logical sequential order indicated by the file management information. In such a case, the time at which the leading end of a file is to be reproduced, i.e., the file reproduction start time, can be computed based on the file size contained in the file link management information.

More specifically, the file reproduction start time of the file F[1] is 0, because the logical sequential order of this file is the "first".

As to the file F[2], this file is logically preceded by the first file F[1] the size of which is 23 pages. Therefore, the file reproduction start time for the file F[2] which is to be reproduced subsequent to the file F[1] is computed as being 23 $T_0$, where $T_0$ represents the time required for reproducing one page.

As to the file F[3], this file is logically preceded by the first file F[2] the size of which is 13 pages and which in turn is preceded by the file F[1] the size of which is 23 pages. Therefore, the file reproduction start time for the file F[3] which is to be reproduced subsequent to the file F[1] is computed as being 36 $T_0$ which is the sum of $13T_0$ and $23T_0$.

The time at which the reproduction of a parallel block recording the data of a file (referred to also as "intra-file parallel-block reproduction start time"), relative to the starting end of the file, can be determined by computing (s—a), based on the data identification information FB(n:s) contained in the block management information and the I number (block sequential number "a" in parallel block and number "b" of component blocks) contained in the block link management information.

For instance, the intra-file parallel-block reproduction start time for the parallel block having the block CB[1:0] equals to the time required for reproducing data of 4 blocks (=4–0), since the data identification information of the BAT entry T[1:2] managing the block CB[1:2] is F[1:4] and the I number of the same is 0/1. Namely, since one block is composed of 4 pages in this embodiment, the intra-file parallel-block reproduction start time of the parallel block having the block CB[1:2] is determined as $16T_0$ which equals to $4\times 4T_0$.

Likewise, the intra-file parallel-block reproduction start time for the parallel block having the block CB[2:0] equals to the time required for reproducing data of 0 block (=1–1), since the data identification information of the BAT entry T[2:0] managing the block CB[2:0] is F[0:1] and the I number of the same is 1/2. Thus, the intra-file parallel-block reproduction start time of the parallel block having the block CB[2:0] is determined as 0 ($0\times 4T_0$).

The time at which the reproduction is started on a page storing data of a file, relative to the time of start of reproduction of the leading end of the parallel block having the block containing this page (referred to also as "intra-parallel-block page reproduction start time), can be determined based on the I number (block sequential number "a" in parallel block and the number "b" of component blocks) of the block link management information which manages the block containing the page of interest. More specifically, the intra-parallel-block page reproduction start time for the (p+1)-th page as counted from the last of the block, can be determined by computing {(b+1)×p+a}.

For instance, the intra-parallel-block page reproduction start time for the third page from the lowest of the block CB[1:2], i.e., the page CBP[1:2:2], is determined to be $4T_0$, i.e., the time required for reproducing 4 pages ((1+1)×2+0=4), because the I number in the block link management information of the BAT entry T[1:2] managing the block CB[1:2] is 0/1 (a=0, b=1).

Similarly, the intra-parallel-block page reproduction start time for the lowest page of the block CB[2:0], i.e., the page CBP[2:0:0], is determined to be $T_0$, i.e., the time required for reproducing 1 pages ((2+1)×0+1=1), because the I number in the block link management information of the BAT entry T[2:0] managing the block CB[2:0] is ½ (a=1, b=2).

It is also possible to determine the time at which reproduction of a page recording data of a file, relative to the time of start of reproduction of the leading end of the file (referred to also as "intra-file page reproduction start time"), can be determined by computing the sum of the above-mentioned intra-file parallel-block reproduction start time and the intra-parallel-block page reproduction start time.

For instance, since the intra-file parallel-block reproduction start time for the parallel block having the block CB[1:2] is $16T_0$ and the intra-parallel-block page reproduction start time of the third page CBP[1:2:2] from the lowest of the block CB[1:2] is $4T_0$, the intra-file page reproduction start time for the page CBP[1:2:2] can be determined as being 20 $T_0$ ($16T_0$ to $4T_0$–$20T_0$).

The page CBP[1:2:2] stores the data FS[1:20], i.e., data of the sector number 20 of the file carrying the file number 1 (see FIG. 1). Thus, the multiplication factor 20 of the intra-file page reproduction start time $20T_0$ of the page CBP[1:2:2] coincides with the sector number 20 of the data FS[1:20] recorded in this page CBP[1:2:2].

As stated above, the intra-file parallel-block reproduction start time for the parallel block having the block CB[2:0] is 0 and the intra-parallel-block page reproduction start time for the lowest page CBP[2:0:0] of this block CB[2:0] is $T_0$. Therefore, the intra-file page reproduction start time for the page CBP[2:0:0] is the sum of 0 and $T_0$, i.e., $T_0$.

The page CBP[2:0:0] stores the data FS[0:1], i.e., data of the sector number 1 of the file carrying the file number 0 (see FIG. 1). As stated above, the multiplication factor 1 of the intra-file page reproduction start time $T_0$ of the page CBP[2:0:0] coincides with the sector number 1 of the data FS[0:1] recorded in this page CBP[2:0:0].

When files stored in the recording medium are sequentially reproduced in accordance with the logical sequence indicated by the file management information, the time at which reproduction of a page of a certain file is started (referred to as "page reproduction start time") is determined as the sum of the file reproduction start time and the intra-file page reproduction start time of the page.

For instance, the page CBP[1:2:2] contains the data of the file identified by the file number 1, i.e., F[1], and the file reproduction start time of this file is 0 as stated before. The intra-file page reproduction start time of the page CBP [1:2:2] is $20T_0$, as explained before. Therefore, the page reproduction start time for the page CBP[1:2:2] is $20T_0$ which is the sum of 0 and $20T_0$.

Similarly, the page CBP [2:0:0] contains the data of the file identified by the file number 0, i.e., F[0], and the file reproduction start time of this file is $36T_0$ as stated before. The intra-file page reproduction start time of the page CBP[2:0:0] is $T_0$, as explained before. Therefore, the page reproduction start time for the page CBP[2:0:0] is $36T_0$ which is the sum of $36T_0$ and $T_0$.

In the parallel recording method which is being described, assuming that writing of data is once finished on a page of a certain block of the parallel block, additional writing on the same page is conducted only after writing is finished on all other blocks of the same parallel block. Therefore, the time interval between the moment at which writing is once over on a page of a block of interest and the moment at which additional writing is conducted on the page of the same block of interest (this interval will be referred to as "page interval time") varies according to the number of the bocks constituting the parallel block. This page interval time can be determined by computing (b+1), based on the I number (block sequential number "a" in parallel block and number "b" of component blocks) of the block of interest.

For instance, the page interval time of the block CB[1:2] is $2T_0$ which amounts to reproduction of 2 pages (1+1=2), since the I number of this bock is 0/1. Similarly, the page interval time of the block CB[2:0] is $3T_0$, which amounts to reproduction of 3 pages (2+1=3), since the I number of this bock is ½.

It is thus possible to easily compute the temporal position of file data on page basis, by using information such as the I number contained in the block link management information. This permits presentation to the user of the time at which data reproduction is to be commenced, relative to various time reference. In addition, the user is enabled to appoint the reproduction start time so that the reproduction is started beginning from the data corresponding to the appointed reproduction start time. It is thus possible to easily perform random access and special reproduction such as fast reproduction, by appointing the reproduction start time. Consequently, the apparatus can be more conveniently and efficiently used for the purpose of, for example, edition of the files.

The file link management information and the block link management information need not be constantly held and stored, because they can be formed based on the block management information as will be described later.

Figure 6:
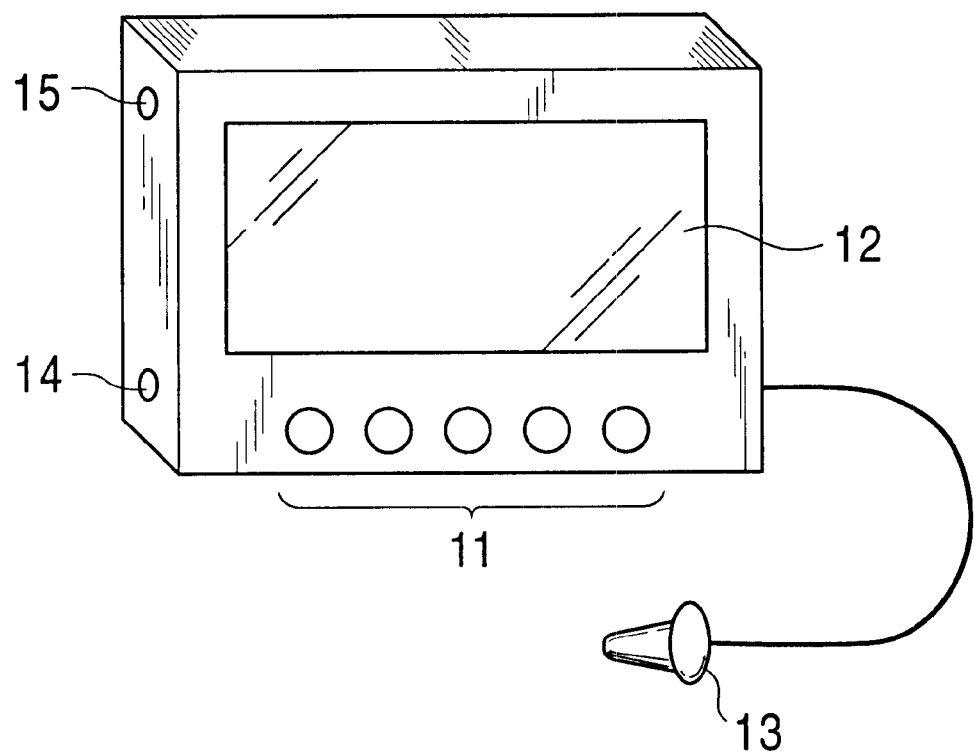
FIG. 6 is a perspective view illustrating an example of the external configuration of a first embodiment of a user terminal to which the present invention has been applied.

Next, FIG. 6 illustrates an external configuration example of a first embodiment of a user terminal (recording/reproducing apparatus) which performs reading and writing of data according to a parallel recording method such as described above.

In this embodiment, an operating unit 11 comprised of buttons and the like operated at the time of providing the device with various types of input, and a frontal display unit 12 of a liquid crystal panel or the like for example, for displaying various types of information, such as text or images. That is, the user terminal has a recording medium 1 (not shown in FIG. 6) built in, and is arranged such that operating the operating unit 11 reads out the data recorded in the recording medium 1, and in the event that that data is text or image data, this data is displayed on the display unit 12.

Further, the user terminal is provided with an earphone 13, so in the event that the data read out from the recording medium 1 is audio data, the sound is output from this earphone 13.

Also, the user terminal may be provided with a speaker, either instead of or along with the earphone 13, so that the sound is output from the speaker. Further, the user terminal is arranged such that, in the event that the data read out from the recording medium 1 is a computer program for example, the computer program is executed at the user terminal, thus carrying out various tasks.

Two terminals 14 and 15 are provided to the left side of the user terminal. The terminal 14 is for input of various types of data provided from the later-described information providing apparatus shown in FIGS. 6 and 7, and the data input from this terminal 14 is recorded in the recording medium 1 built into the user terminal. The terminal 15 is for outputting the data reproduced from the recording medium 1, and the arrangement is such that the data recorded in the recording medium 1 can be output from this terminal 15 and supplied to external displays, speakers, and so forth. Incidentally, the data recorded in the recording medium 1 can also be output from the terminal 14.

Figure 7:
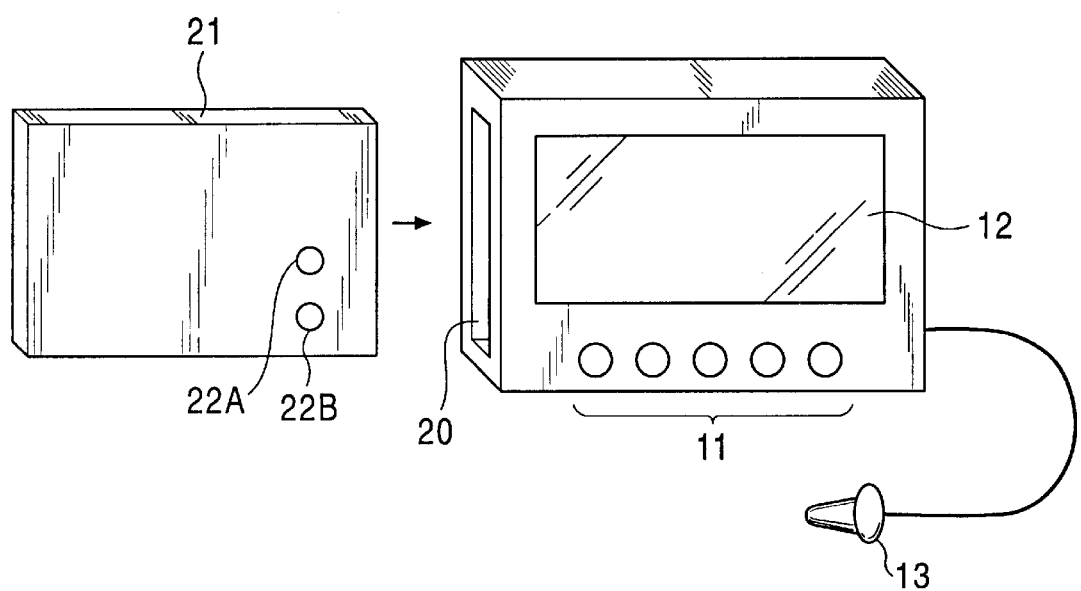
FIG. 7 is a perspective view illustrating an example of the external configuration of a second embodiment of a user terminal to which the present invention has been applied.

Next, FIG. 7 illustrates an external configuration example of a second embodiment of a user terminal which performs reading and writing of data according to the parallel recording method. Now, in the Figure, the parts equivalent to those shown in FIG. 6 are denoted with the same reference numerals.

With this embodiment, a slot 20 for mounting a memory card 21 is provided to the left side of the user terminal, instead of the terminals 14 and 15.

The memory card 21 has a recording medium 1 built in, and this user terminal is arranged such that the data recorded in the recording medium 1 can be used by inserting and mounting the memory card 21 into the slot 20, in the same manner as with the first embodiment shown in FIG. 6.

A terminal 22A is provided to the front of the memory card 21, this terminal 22A being arranged so as to come into contact with a terminal (not shown) within the slot 20 in the event that the memory card 21 is inserted into the slot 20, thereby electrically connecting the memory card 21 with the user terminal. Thus, electrically connecting the user terminal and the memory card 21 allows the data recorded within the recording medium 1 built into the memory card 21 to be used, i.e., the data recorded within the recording medium 1 built into the memory card 21 is read out (reproduced) via the terminal 22A.

Also, a terminal 22B is provided to the front of the memory card 21, in addition to the terminal 22A. The terminal 22B is configured such that inserting the memory card 21 into the slot 33 of a later-described information providing apparatus shown in FIG. 8 brings the terminal 22B into contact with a terminal (not shown) within the slot 33, thereby electrically connecting the memory card 21 with the information providing apparatus. Thus, electrically connecting the information providing apparatus and the memory card 21 allows the information providing apparatus to record data to the recording medium 1 built into the memory card 21, i.e., the data provided by the information providing apparatus is supplied to the memory card 21 via the terminal 22B, and recorded into the recording medium 1 built therein.

With an arrangement such as shown in FIG. 7 wherein the memory card 21 is detachable from the user terminal, the memory card 21 alone can be transported to the location where the information providing apparatus is set up, and thus received the data, so this arrangement is handier regarding portability as compared to the embodiment shown in FIG. 6 wherein the recording medium 1 is built into the user terminal.

Also, though the embodiment shown in FIG. 7 has two terminals; a terminal 22A for outputting data recorded in the recording medium 1, and a terminal 22B for inputting data to be recorded in the recording medium 1, the arrangement may be such wherein the memory card 21 only has one terminal and the one terminal is electrically switched between outputting data recorded in the recording medium 1 inputting data to be recorded in the recording medium 1.

Figure 8:
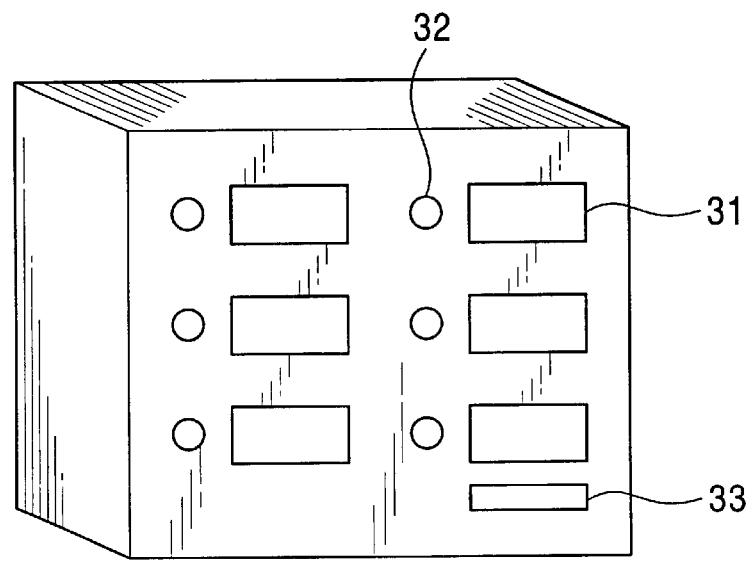
FIG. 8 is a perspective view illustrating an example of the external configuration of a first embodiment of an information providing apparatus which provides data to user terminals.

Next, FIG. 8 is a perspective view illustrating an example of the external configuration of a first embodiment of an information providing apparatus which provides data to user terminals such as shown in FIG. 6 or recording medium 1 built into memory cards 21 such as shown in FIG. 7.

This information providing apparatus is provided with display units 31 which display the contents, price, etc., of the data to be provided to the user on the front panel, and operating buttons 32 which are operated at the time of selecting data displayed on the display unit 31. Incidentally, with the embodiment shown in FIG. 8, there are six sets of combinations of the display units 31 and operating buttons 32, so that six types of data can be provided.

Further, a slot 33 for inserting and removing the user terminal shown in FIG. 6 or the memory card 21 shown in FIG. 7 is provided to the front panel.

A user that desires to receive data first inserts a user terminal such as shown in FIG. 6 or a memory card 21 such as shown in FIG. 7, into the slot 33. This electrically connects the terminal 14 of the user terminal or the terminal 22B of the memory card to the information providing apparatus.

Then, the user views the display units 31, and operates the operating buttons 32 according to the desired data. Thus, the data corresponding to the operated operating button 32 is transferred to and recorded (copied) to the recording medium 1 built into the user terminal or memory card 21 inserted into the slot 33.

That is, the information providing apparatus has a recording medium with recorded data corresponding to the six display units 31 provided on the front panel recorded therein, and a copy control unit necessary for controlling the copying of the data recorded in the recording medium (neither shown in the Figure). With the information providing apparatus, in the event that the operating button 32 is operated, the data is read out from the recording medium storing the data corresponding to that operation, under the control of the copy control unit, and the data is transferred to the recording medium 1 built into the user terminal or memory card 21 inserted into the slot 33 and recorded.

Also, the information providing apparatus may be connected to a data management center for managing data to be provided, via a cable or wireless communication line. In this case, the information providing apparatus can received data corresponding to the operated operating button 32 from the data management center via the communication line, and provide the user with this data, so in this case, the information providing apparatus does not need to be provided with a recording medium for recording the data to be provided to the user. Or, an arrangement may be made wherein the recorded contents of the recording medium built into the information providing apparatus is updated by data transmitted via the communication line, thereby doing away with the trouble of manually exchanging the recording medium built into the information providing apparatus each time the data is to be updated. Further, with such an arrangement, the data recorded in the recording medium can be repeatedly provided to users without requiring reception of the data from the data management center again, thereby reducing communication costs and providing the newest data at the same time.

Figure 9:
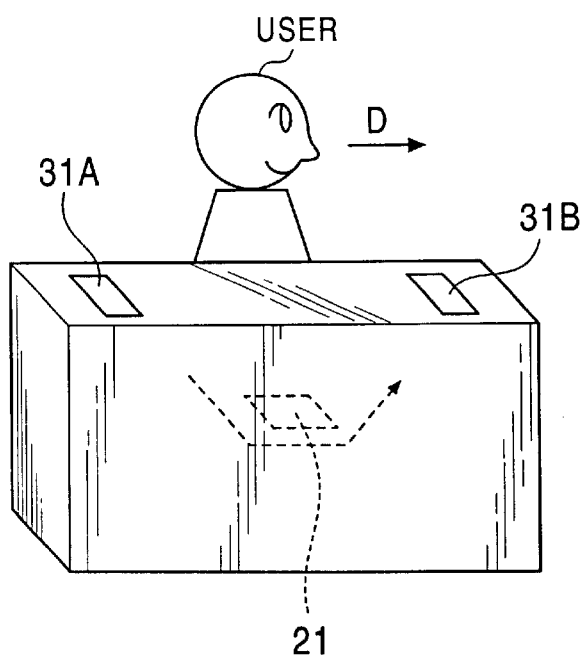
FIG. 9 is a perspective view illustrating an example of the external configuration of a second embodiment of an information providing apparatus which provides data to user terminals.

Next, FIG. 9 illustrates an external configuration example of a second embodiment of the information providing apparatus.

This embodiment has an upper face which is about waist-high for an average user, and an insertion slot 31A for inserting the memory card 21 and discharging slot 31B for discharging the memory card 21 inserted from the insertion slot 31A, on the upper face.

A user desiring to receive data inserts the memory card 21 into the insertion slot 31A, and walks in the direction indicated by the arrow D in the Figure. The information providing apparatus has built therein a transporting device (not shown) for transporting the memory card 21 from the insertion slot 31A to the discharging slot 31B, and the data is recorded to the memory card 21 somewhere during the transportation (or while transporting). The time for transporting the memory card 21 from the insertion slot 31A to the discharging slot 31B is arranged to be about the same as the amount of time required for the user to walk from the insertion slot 31A to the discharging slot 31B, so the user can insert the memory card 21 in the insertion slot 31A and walk in the direction of the arrow D to the discharging slot 31B, and find the memory card 21 with the data recorded thereto being discharged therefrom.

Such an arrangement for an information providing apparatus allows a greater number of users to receive data in a speedier manner.

Now, the transporting device built into the embodiment shown in FIG. 9 may be modified so that user terminals with the recording medium 1 built in such as shown in FIG. 6 can also receive data.

Next, FIG. 10 is a block diagram illustrating an example of the electrical configuration of the user terminal shown in FIG. 6.

As shown in FIG. 1, the recording medium 1 has four (multiple) recording medium pieces 1A through 1D, so as to record data. While the type of recording medium pieces 1A through 1D is not particularly restricted, semiconductor memory is preferably used, since recording (storing) can be performed at high speeds of a certain level, random access can be made, and portability is excellent. Here, the semiconductor memory for the recording medium pieces 1A through 1D is non-volatile memory, which does not require back-up from a battery, e.g., NAND flash memory. More specifically, EEPROM (Electrically Erasable and Programmable Read-Only Memory) such as described in "32-Mbit NAND Flash Memory" ("Electronic Materials", June 1995, pp 32–37), etc., can be used for the recording medium pieces 1A through 1D.

Incidentally, the number of recording medium pieces making up the recording medium 1 is preferably $$\text{ceil}(t_{prog}/t_{input})+1 \text{ or greater,}$$

wherein ceil (x) represents a minimum integer of x or greater.

Accordingly, there are types of NAND flash memory (EEPROM) wherein the program time $t_{prog}$ is approximately ten times that of the data input time $t_{input}$, so in the event that such flash memory is to be used for the recording medium pieces, the recording medium 1 should preferably have 11 or more recording medium pieces.

The file management information storing unit 2 and the block management information storing unit 3 respectively store the file management information and block management information described with reference to FIG. 2.

Now, in the event that the user terminal is configured so that the memory card 21 is detachable, as shown in FIG. 7, the memory card 21 is comprised of the above recording medium 1, file management information storing unit 2, and block management information storing unit 3.

The file link management information storing unit 4 and the block link management information storing unit 5 are intended to store the file link management information and the block link management information described before in connection with FIG. 5.

The operating unit 11 is configured so as to be operated by the user, and supply the signals corresponding to the operating to the transfer control unit 41, recording medium control unit 42, and reproducing control unit 43. The display unit 12 displays the data (that which can be displayed) output from the reproducing control unit 43. Also, the display unit 12 performs display according to the control of the recording medium control unit 42.

The transfer control unit 41 controls the transfer of data supplied from the terminal 14 to the recording medium control unit 42, and the transfer of data supplied from the recording medium control unit 42 to the terminal 14.

The recording medium control unit 42 is arranged so as to record (write) the data supplied from the transfer control unit 41 to the recording medium 1, and to reproduce (read) the data recorded in the recording medium 1 and supply this to the transfer control unit 41 or reproducing control unit 43. Also, the recording medium control unit 42 controls the recording and reproducing (reading) of data to and from the recording medium 1 according to the parallel recording method, based on the information stored in the file management information storing unit 2 and block management information storing unit 3, as well as on the information stored in the file link management information storing unit 4 and the bock link management information storing unit 5.

The recording medium control unit 42 also performs rewriting of file management information and block management information stored in the file management information storing unit 2 and block management information storing unit 3, as well as the file link management information and the block link management information stored in the file link management information storing unit 4 and the block link management information storing unit 5, control of the deleting operation of the recording medium 1, and further display control of the display unit 12, and so forth.

The reproducing control unit 43 is arranged so as to perform reproducing control of the data from the recording medium control unit 42. That is to say, in the event that the data from the recording medium control unit 42 is encoded, the reproducing control unit 43 performs the decoding. In the event that the decoded results can be displayed, the data is supplied to the display unit 12, or if the decoded results are sound which can be output, the data is supplied to the earphone 13. Further, in the event that the decoded results are an executable computer program, the reproducing control unit 43 performs certain processing by executing the computer program. Also, in the event that the data to be reproduced is real-time data, the reproducing control unit 43 requests the data from the recording medium control unit 42, in order to maintain the time-wise validity thereof (e.g., so that the corresponding sound is properly output in the event that the data to be reproduced is audio data).

Now, regarding methods for encoding video data or audio data, there are methods following the MPEG (Moving Picture Experts Group) standards. Also, the data obtained by decoding being performed at the reproducing control unit 43, as well as any computer program or other data received by the reproduction control unit 43 from the recording medium control unit 42, can also be output from the terminal 15. It is also to be understood that the user's terminals can exchange data between themselves, via the terminal 14 (transfer control unit 41).

Now, the blocks configuring the user terminal shown in FIG. 10 are each realized by hardware, physical mechanisms, a CPU (Central Processing Unit), etc., executing computer programs.

Figure 11:
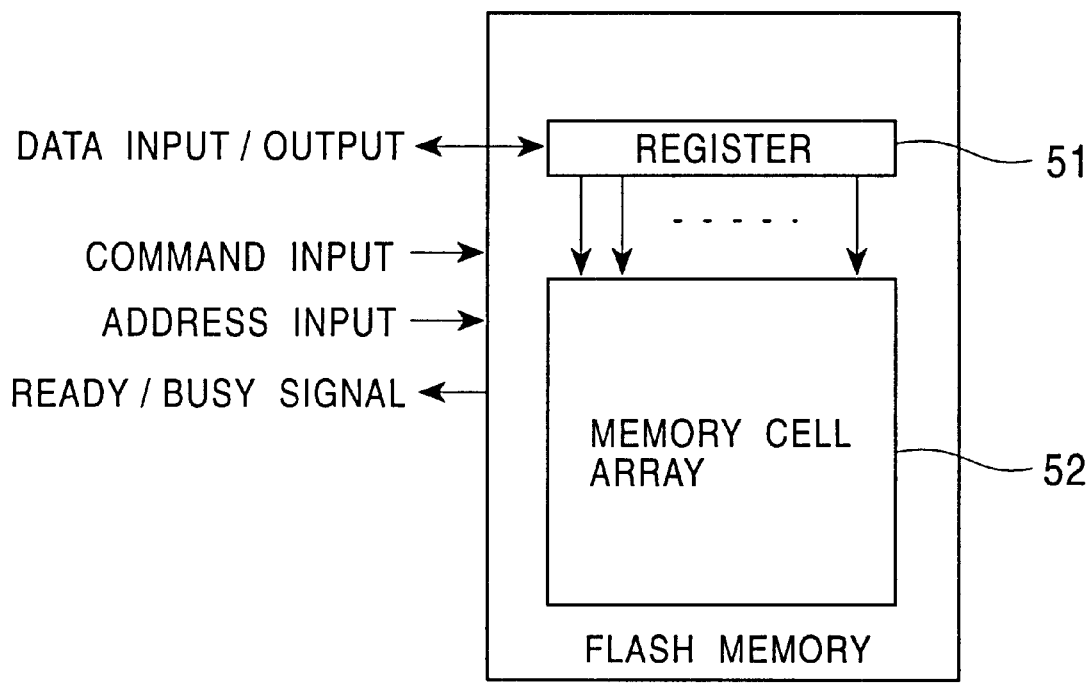
FIG. 11 is a block diagram illustrating a configuration example of flash memory.

Next, FIG. 11 illustrates an example of a configuration of NAND flash memory serving as the recording medium pieces 1A through 1D, making up the recording medium 1, as shown in FIG. 8.

The flash memory is mainly comprised of two portions; the register 51 and memory cell array 52, where data to be recorded, commands, and addresses can be input. Also, the recorded data, and Ready/Busy signals indicating the internal state can be output from the flash memory.

In the event of recording data to flash memory configured thus, a command instructing input of the data to be recorded (i.e., an input command), the address to record the data to, and the data to be recorded, are provided. The data to be recorded is provided in units of pages (as mentioned above, 512 bytes here). In this case, the data to be recorded is input to the register 51 and temporarily stored, in accordance with the input command. Subsequently, providing the flash memory with a command instructing recording (a write command) causes the data recorded in the register 51 to be transferred to the memory cell array 52 in accordance to the write command, and to be recorded (held) at the address supplied along with the input command.

On the other hand, in the case of reading data from the flash memory (i.e., reproducing data), a command instructing reproducing (a read command), and the address at which the data to be reproduced is, is provided. In this case, the data is read from the address of the memory cell array provided along with the read command, in accordance with the read command, and is supplied to the register 51 and temporarily stored. Then, the data stored in the register 51 is output from the flash memory.

Now, the Ready/Busy signal works as follows. The Ready/Busy signal has an H (high) level and L (low) level, and in the event that commands can be accepted, the level of the signals is set at L, for example (hereafter, a Ready/Busy signal of an L level may also be referred to as a "Ready signal"). In the event that commands cannot be accepted, the level of the signals is set at H (hereafter, a Ready/Busy signal of an H level may also be referred to as a "Busy signal").

Also, through not shown in FIG. 11, the flash memory is also arranged so as to take chip selecting signals, along with addresses (chip selecting signals can be considered to be included as part of the address).

Next, the operation of the user terminal shown in FIG. 10 will be described.

First, in the case of recording data to the recording medium 1, signals instructing file recording (hereafter referred to as "recording instruction signals") are supplied from the information providing apparatus shown in FIG. 8 or FIG. 9 to the recording medium control unit 42 via the terminal 14 and transfer control unit 41. Upon receiving the recording instructing signals, the recording medium control unit 42 makes reference to the block management information storing unit 3, so as to recognize available blocks in the recording medium 1. Further, the recording medium control unit 42 selects one or more blocks from the recognized available blocks, and configures a parallel block for recording the file to be recorded, with the parallel recording method.

On the other hand, upon receiving the recording instruction signal supplied from the terminal 14, the transfer control unit 41 outputs the recording instruction signal to the recording medium control unit 42, then subsequently takes in a file to be recorded that is supplied from the information providing apparatus shown in FIG. 6 or 7 via the terminal 14, and transfers the file to the recording medium control unit 42, following downwards transfer protocol. Now, examples of downwards transfer protocols which can be used include ANSI (American National Standards Institute) X3.131-1986 which is known as SCSI (Small Computer System Interface), IEEE (Institute of Electrical and Electronic Engineers) standard 1394, PCMCIA (Personal Computer Memory Card International Association) PC Card standard, and so forth, including physical layers. While other original protocols may be used for downwards transfer protocol, but the user terminal can be arranged to be highly expandable by employing standardized interfaces such as described above.

Following configuring of the parallel block, the recording medium control unit 42 receives the file being transferred from the transfer control unit 41 as described above, and then transfers and records the file to the recording medium 1 by the parallel recording method serving as an upwards transfer protocol.

That is, the recording medium control unit 42 supplies a chip selecting signal to the chip of the flash memory recording medium pieces 1A through 1D in the recording medium 1 configured as shown in FIG. 11, to which the data is to be written. Further, the recording medium control unit 42 provides one page of data to be recorded, an input command, and an address for recording the data. Thus, following the elapsing of the data input time $t_{input}$, one page of data is input to the register 5 and stored at the recording medium piece 1A through 1D which has received the chip selecting signal (hereafter referred to as "selected recording medium piece"), in accordance with the input command. Then, the recording medium control unit 42 provides a write command to the selected recording medium piece, so the data stored in the register 51 at the selected recording medium piece is supplied to the memory cell array 52, and is recorded to the provided address, after elapsing of the program time $t_{prog}$. Incidentally, the selected recording medium piece outputs a Busy signal from the time of receiving the write command till the one page of data stored in the register 51 has been recorded in the memory cell 52.

Such processing is performed with the recording medium piece having blocks comprising the parallel block as the selected recording medium piece. Now, data is recorded here with the parallel recording method, so basically, data input from the recording medium control unit 42 to the recording medium 1 (and also data input from the transfer control unit 41 to the recording medium control unit 42) can be performed without waiting for the program time $t_{prog}$.

Subsequently, when writing of the data making up one file is completed, the recording medium control unit 42 forms the file management information and block management information concerning the file, in accordance with the result of writing of the file in the recording medium 1, and stores them in the file management information storing unit 2 and block management information storing unit 3.

Now, the data recording capabilities of the overall user terminal (i.e., how fast the data can be recorded) is determined of the slower of the capabilities of the transfer control unit 41 transferring data to the recording medium control unit 42 and the recording medium control unit 42 recording data to the recording medium 1, so it is preferable that the recording medium control unit 42 has capabilities of writing data to the recording medium 1 without lowering the data transfer capabilities of the transfer control unit 41, and the parallel recording method is particularly useful for the recording medium control unit 42 of which such capabilities are required.

Incidentally, when writing data to the recording medium pieces 1A through 1D which comprise flash memory, in the event that the data of the address to which the data is to be written has not yet been deleted, the recording medium control unit 42 deletes the previous data before writing the data there.

Next, in the case of reading (reproducing) the data (file) recorded in the recording medium 1, the user operates the operating unit 11 so as to reproduce data, for example. The operating signal corresponding to this operation (hereafter referred to as "reproduction instructing signal") is supplied to the recording medium control unit 42, and once the recording medium control unit 42 receives the reproduction instructing signal from the operating unit 11, reference is made to the file management information stored in the file management information storing unit 2, and the display unit 12 is controlled via the reproduction control unit 43 so as to display the file name of the file recorded in the recording medium 1. The user makes reference to the file name of the file displayed on the display unit 12, and instructs the operating unit 11 so as to read the file from the recording medium 1, whereupon the file name is supplied to the recording medium control unit 42. Once the recording medium control unit 42 receives the instruction of the file name of the file to be read from the operating unit 11, reference is made to the file management information and block management information of the file, as well as the file link management information and the block link management information, thereby recognizing the address where the file is stored, and the total size of the file. Further, the recording medium control unit 42 executes upwards transfer protocol (reading data recorded by the parallel recording method), thereby reading the data of the file instructed by the operating unit 11, from the recording medium 1.

That is, the recording medium control unit 42 supplies a chip selecting signal to the flash memory recording medium pieces 1A through 1D in the recording medium 1 configured as shown in FIG. 11, from which the data is to be read (i.e., the selected recording medium piece). Further, the recording medium control unit 42 provides the selected recording medium piece with a read command and an address where the data to be read is located. Thus, in the selected recording medium piece, one page of data is read from the provided address (address in the memory cell array 52) following elapsing of a certain stipulated period (the time required for transferring data from the memory cell array 52 to the register 51 in the flash memory), and is stored in the register 51. Then the data stored in the register 51 is supplied to the recording medium control unit 42, thus completing reading of the one page of data. Incidentally, the selected recording medium piece outputs a Busy signal from the time of receiving the read command till reading of the one page of data to the register 51 has been completed.

Such processing is performed with the recording medium piece having blocks where the file to be read is recorded, as the selected recording medium piece.

Then, the data read from the recording medium 1 by the recording medium control unit 42 is supplied to the transfer control unit 41 or the reproducing control unit 43. Incidentally, whether the data read from the recording medium 1 is supplied to the transfer control unit 41 or the reproducing control unit 43 can be instructed from the operating unit 11, for example.

In the event that the data read from the recording medium 1 is supplied to the transfer control unit 41, the data is output externally from the terminal 14, by executing a downwards transfer protocol.

Also, in the event that the data read from the recording medium 1 is supplied to the reproducing control unit 43, the reproducing control unit 43 supplies the data to the display unit 12 or earphone 13 for display or output, or externally outputs the data from the terminal 15. Also, in the event that the data is a computer program, the reproducing control unit 43 executes the computer program, or outputs the computer program externally via the terminal 15.

The file-link management information and the block-link management information (hereinafter, this may be referred to as "auxiliary information") described with reference to FIG. 5 are created in the recording medium control unit 42 in accordance with the block management information. The information is created when the user terminal is powered on or with other predetermined timings (for example, in response to a request from a user or immediately after writing shown in FIG. 13, which will be described below, is performed).

Figure 12:
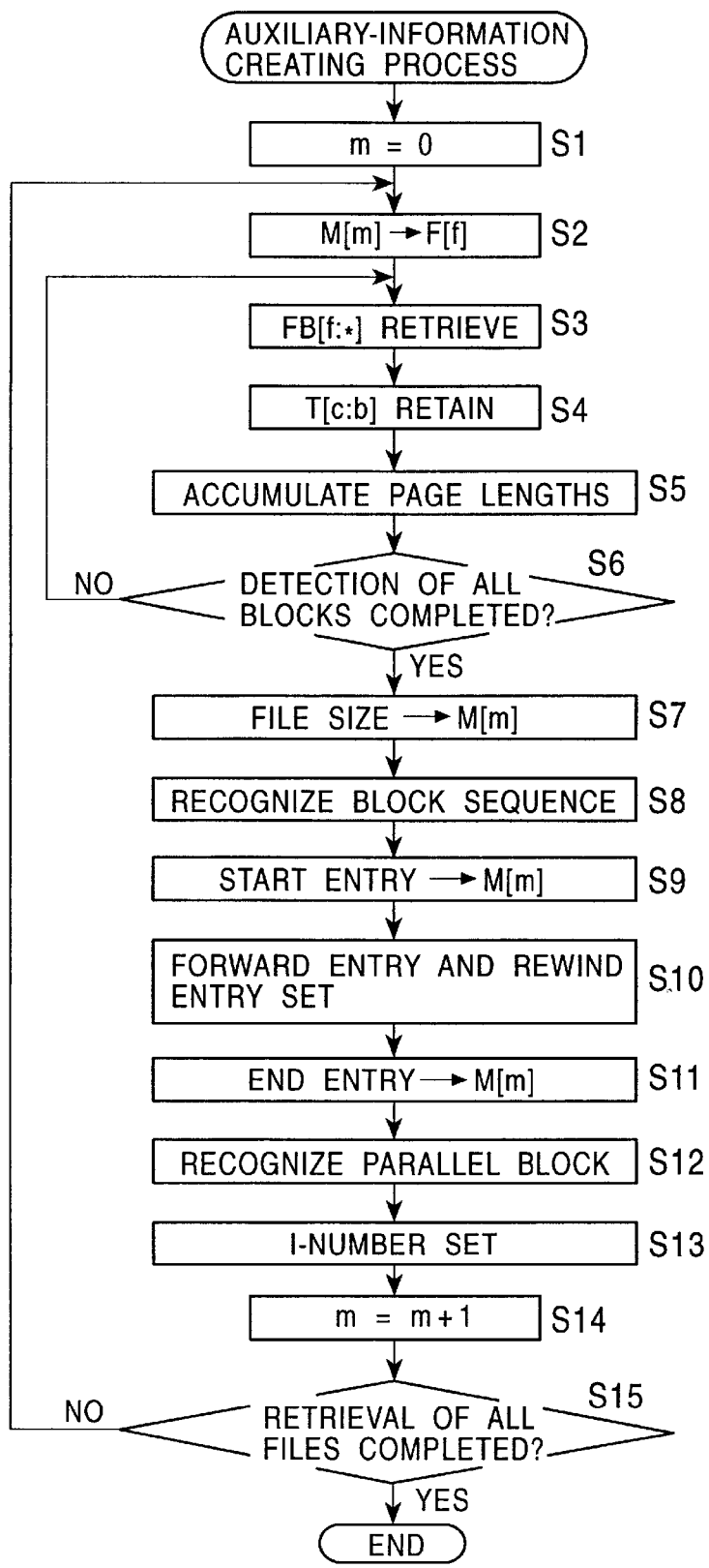
FIG. 12 is a flowchart illustrative of an auxiliary-information creating process.

Hereinbelow, referring to a flowchart in FIG. 12, a description will be given of a process for creating auxiliary information (auxiliary-information creating process) to be performed by the recording medium control unit 42.

In step S1, the recording medium control unit 42 first initializes a variable m to, for example, 0. The variable m is used to count entries in the file management storing unit 2. Step S2 recognizes a file name F[f], which is file management information stored in an entry M[m] of the file management storing unit 2, and passes processing control to Step 3. In the case shown in FIG. 4, when m=0, a file name F[1] recorded in an entry M[0] is recognized.

Step S3 accesses the block management information, as shown in FIG. 4, and retrieves data identification information FB[f:*] (the * indicates the sequence number s to be disregarded (wildcard)). When a logical address of a BAT entry of the block management information having data identification information FB[f:s] retrieved in step 3 is represented by T[c:b], the recording medium control unit 42 stores the physical address (BAT entry) T[c:b] in step S4. Then, the processing proceeds to step S5.

Step S5 performs an add operation for the page length of block management information being stored in the BAT entry T[c:b], which is stored in step S4, to a variable $F_{size}$ which represents the file size. Then, the processing proceeds to step S6, and judgment is made whether or not retrieval (detection) has been completed for all the data identification information FB [f:*] that has a file number agreeing with a file number f of the file name F[f] recognized in step S2. If step S6 judges that the retrieval (detection) has not been completed for the all the data identification information FB [f:*], which has file numbers agreeing with the file number f of the file name F[f] recognized in step S2, the processing returns to step S3 to repeat the processing for the rest of information. If step S6 judges that the retrieval (detection) has not yet been completed for the all the data identification information FB [f:*], which has the file number agreeing with the file number f of the file name F[f] recognized in step S2, the processing proceeds to step S7.

In the above, for example, in step S2, when the file name F[1] in FIG. 4 is recognized, steps S3 to S6 are loop-processed. In this case, data identification information items FB[1:3], FB[1:0], FB[1:4], FB[1:1], FB[1:2], and FB[1:5] in FIG. 4 are retrieved in that order (when the retrieval is carried out from entries under the block management information storing unit 3), and as a result, BAT entries T[0:1], T[1:1], T[1:2], T[2:2], T[3:1], and T[3:2] are stored in the recording medium control unit 42.

Also, step S5 finally sets 23 (=4+4+4+4+4+3) to the variable $F_{size}$. After step S2 is completed, the variable $F_{size}$ is reset to 0 before step S3 starts.

Step S7 writes a value set to the $F_{size}$ as the file size of an entry M[m] to the file-link management information storing unit 4, and the processing proceeds to step S8. Then, step S8 sequences the BAT entry T[c:b] stored by step S4 according to the sequence number s stored therein, thereby recognizing the sequence (block sequence) in which data of the file F[f] for block in which data of the file F[f] is stored.

Specifically, when in the file name F[1] in FIG. 4 is recognized in step S2, as described above, the data identification information items FB[1:3], FB[1:0], FB[1:4], FB[1:1], FB[1:2] and FB[1:5] are retrieved, and the BA entries T[0:1], T[1:1], T[1:2], T[2:2], T[3:1], and T[3:2] are stored in the recording medium control unit 42. In this case, the BAT entries are sequenced in the ascending order of data identification information F[1:s] stored therein, and as a result, the entries are sequenced so as to be T[1:1], [2:2], T[3:1], T[0:1], T[1:2] and T[3:2]. According to be above, the block sequence is recognized to be CB[1:1], CB[2:2], CB[3:1], CB[0:1], CB[1:2] and CB[3:2].

After the BAT entries are sequenced for the file F[f] in the above procedure, the processing proceeds to step S9. Instep S9, the first one in a column of the BAT entries, sequenced for file F[f] is written as a start entry of the entry M[m] in the file-link management information storing unit 4 in FIG. 5. Then, the processing proceeds to step S10.

In step S10, one of the column of BAT-entries, which have been sequenced for the file F[f], is serially selected as a BAT entry of interest. Also, as a forward entry or a rewind entry of the BAT entry of interest in the block-link management storing unit 5 (in FIG. 5), a BAT entry before or after the entry of interest in the column of the BAT entries, which have been sequenced for the file F[f], is written. Then, the processing proceeds to step S11.

When the first entry in the column of the BAT entries, which are sequenced for the file F[f], is selected as the BAT entry of interest, no BAT entries occur before the BAT entry of interest. Therefore, the rewind entry of the BAT entry of interest in the block-link management storing unit 5 is, for example, invalidated. Similarly, when the last entry in the column of the BAT entries, which are sequenced for the file F[f], is selected as the BAT entry of interest, no BAT entries occur after the BAT entry of interest. Therefore, the forward entry of the BAT entry of interest in the block-link management storing unit 5 is invalidated.

Step S11 writes the last one in the column of the BAT entries, which are sequenced for the file F[f], as the end entry of the M[m] entry of the file-link management information storing unit 4 (in FIG. 5). Then, the processing proceeds to step S12.

In the above, for example, for the file F[1] to be processed when m=0, as shown in FIG. 4 or as described above, the BAT entries are sequenced so as to be T[1:1], [2:2], T[3:1], T[0:1], T[1:2] and T[3:2]. Therefore, in step S9 or S10, as shown in FIG. 5, the first BAT entry [1:1] and the last BAT entry [3:2] in the column of the BAT entries, which have been sequenced for the file F[f], are written in the start entry are the end entry, respectively.

In step S10, the forward entry and the rewind entry of the BAT entry [1:1] are changed to T[2:2] and invalidated, respectively; and the forward entry and the rewind entry of the BAT entry [2:2] are changed to T[3:1] and T[1:1], respectively. Also, the forward entry and the rewind entry of the BAT entry [3:1] are changed to T[0:1] or T[2:2], respectively; and the forward entry and the rewind entry of the BAT entry [0:1] are changed to T[1:2] and T[3:1], respectively. Also, the forward entry and the rewind entry of the BAT entry [1:2] are changed to T[3:2] and T[0:1], respectively; and the forward entry and the rewind entry of the BAT entry [3:2] are invalidated or changed to T[1:2], respectively (in FIG. 5).

Consecutively, step S12 recognizes a parallel block in the block sequence of the file F[f] (block sequence of the block in which data of the file F[f] is stored). In other words, step S12 serially accesses loop flags in the block management information block (in FIG. 4) stored in the individual BAT entries in the BAT-entry column which have been sequenced for the file F[f], and recognizes blocks having a "1" loop flag as "1" parallel blocks.

For example, as described above, the block sequence for the file F[1] is set as CB[1:1], CB[2:2], CB[3:1], CB[0:1], CB[1:2] and CB[3:2], and a column of BAT entries sequenced for file F[1] is set as T[1:1], [2:2], T[3:1], T[0:1], T[1:2] and T[3:2]. Also, in FIG. 4, the loop flag in the block management information stored in the BAT entry [0:1] and the loop flag in the block management information stored in the BAT entry [3:1] are represented by "1". In this case, in the block sequence CB[1:1], CB[2:2], CB[3:1], CB[0:1], CB[1:2] and CB[3:2], blocks up to the block CB[0:1] corresponding to the BAT entry T[3:2] having the loop flag "1" and blocks up to the block CB[3:2] corresponding to the BAT entry T[3:2] are recognized as blocks configuring parallel blocks. That is, the first parallel block configured of the four blocks CB[1:1], CB[2:2], CB[3:1], and CB[0:1], and the second parallel block configured of the two blocks CB[1:2] and CB[3:2] are recognized.

After the parallel blocks are recognized, the processing proceeds to step S13. In step S13, I numbers of the individual blocks configuring the recognized parallel blocks are produced and written in the block-link management storing unit 5 as block-link management information for managing the corresponding blocks. That is, in step S13, a value representing the number of the blocks configuring the recognized parallel blocks from which 1 is subtracted is produced as a constitution number "b". Also, in step S13, the individual blocks configuring the parallel blocks are sequenced in the order of the block sequence, and a value representing the sequence from which 1 is subtracted is produced as the block No. in parallel block "a" of the blocks. In step S13, for all the parallel blocks recognized in step S12, the block No. in parallel block is produced, and the number of component blocks and the I number consisting of the component blocks for the parallel blocks and the block No. in parallel block of the blocks configuring the parallel blocks (=block No. in parallel block/number of component blocks) are written in the block-link management storing unit 5 as the block-link management information.

In the above, for example, as described above, the first parallel block configured of the four blocks CB[1:1], CB[2:2], CB[3:1], and CB[0:1], and the second parallel block configured of the two blocks CB[1:2] and CB[3:2] are recognized. In this case, since the first parallel block or second parallel block is configured of four blocks or two blocks, the number of the respective component blocks is 3 or 1. Also, since the blocks CB[1:1], CB[2:2], CB[3:1], and CB[0:1] configuring the first parallel block are sequenced in that order, block No. in parallel blocks thereof are individually represented by 0, 1, 2, and 3. Also, since the blocks CB[1:2] and CB[3:2] configuring the second parallel block are sequenced in that order, block No. in parallel blocks thereof are individually represented by 0 and 1.

From the above, I numbers of the blocks CB[1:1], CB[2:2], CB[3:1], CB[0:1], CB[1:2] and CB[3:2] that configures the block sequence for file F[1] are represented by 0/3, 1/3, 2/3, 3/3, 0/1, and 1/1, and these I numbers are written in the block-link management storing unit 5 (FIG. 5).

After having written the I numbers, step S14 increases the variable m only by 1, then passes processing control to step S15. Step S15 judges whether or not processing has been performed for all the files for which file management information as file names are recorded in the file management storing unit 2. If step S15 judges that processing has not yet been performed for all the files for which file management information is stored in the file management storing unit 2, the processing returns to step S2 to repeat the processing for the rest of files.

If step S15 judges that processing has already been performed for all the files for which file management information is stored in the file management storing unit 2, the program ends the auxiliary-information creating process.

Hereinbelow, referring to FIG. 13, a description will be given of data-recording processing (writing process) in the recording medium control unit 42 in FIG. 10.

In recording data, as described above, a recording instruction signal is issued from the transfer control unit 41 to the recording medium control unit 42. In step S21, the recording medium control unit 42 recognizes the instruction for writing (processing) data in a file (write-object file) to the recording medium 1.

In step S22, the recording medium control unit 42 recognizes information, for example, a file name and a data amount (capacity), regarding the write-object file. The information regarding the write-object file is sent from the information providing apparatus, as shown in FIGS. 8 and 9, via, for example, the recording instruction signal. Consecutively, the processing proceeds to step S23 in which the recording medium control unit 42 accesses the block management information storing unit 3 and detects free blocks in the procedure described above. The recording medium control unit 42 then judges whether or not the recording medium 1 has a sufficient number of free blocks necessary for storing the write-object file.

If step S23 judges the recording medium 1 does not have a sufficient number of free blocks for storing the write-object file, the write-object file cannot be written in the recording medium 1, and the processing then proceeds to step S24. Step S24 performs free-block securing processing, deleting existing files. Then, the processing returns to step S23. If step S23 judges the recording medium 1 has a sufficient number of free blocks for storing the write-object file, the processing proceeds to step S25. In step S25, the recording medium control unit 42 secures a parallel block group comprising at most one parallel block that will record the write-object file. In particular, the recording medium control unit 42 selects at least one free block from each of the recording medium pieces 1A to 1D, and uses the selected free blocks to configure one parallel block. The recording medium control unit 42 repeats the above until it secures at least one parallel block having a sufficiently large capacity for the write-object file. In the above procedure, the recording medium control unit 42 secures the parallel block group comprising at least one parallel block for storing the write-object file.

After having secured the parallel block group, a writing-object parallel block (hereinafter, this may be referred to as a "parallel block of interest") is selected from the parallel blocks configuring the parallel block group. Then, the processing proceeds to step S27. Step S27 selects a selected recording medium piece, which is one of the recording medium pieces which has blocks configuring the parallel block of interest, from the recording medium pieces 1A to 1D that configure the recording medium 1. Then, the selected recording medium piece is given a chip-selecting signal. In step S27, for example, in configuring the parallel block, an earlier-selected recording medium piece, which has blocks, is given priority so as to be selected earlier.

Subsequently, the processing proceeds to step S28 in which the state of the selected recording medium piece is judged. If step S28 judges the selected recording medium piece to be in a Busy state where a Busy signal is outputted, the selected recording medium piece cannot be accessed, and the processing returns to step S28. If step S28 judges the selected recording medium piece to be in a Ready state where a Ready signal is outputted, that is, when the selected recording medium piece can be accessed, the processing proceeds to step S29. Step S29 writes one-page data in the record-object file to a page in the block that configures the parallel block of interest.

In the course where the loop processing including steps S27 to S30 (described below) is performed, step S29 writes one-page data to a block in the sequence from the first address of the block. For example, suppose the parallel block is configured of four blocks, namely, the first to fourth blocks, and the parallel block is configured of four pages, namely, the first to fourth pages. In this case, in writing of data to the parallel block, data is written sequentially to the first page of the first block, the first page of the second block, the first page of the third block, and the first page of the fourth block. Subsequently, data is written sequentially to the second page of the second block, the second page of the second block, the second page of the third block, and the second page of the fourth block. In the similar manner, data-writing is continued up to the fourth page of the fourth block. Basically, as described above, data-writing in step S29 proceeds without being interrupted by a wait time due to the program time $t_{prog.}$ In step S29, after one-page data has been written, the processing proceeds to step S30 that judges the completion status of data-writing to the entire space of the parallel block of interest. If the step S30 judges data-writing to the entire space of the parallel block of interest to be incomplete, the processing returns to step S27. For example, suppose the parallel block of interest is configured of four blocks, namely, the first to fourth blocks, and when selection has been carried out in the sequence of the first to fourth blocks in configuring the parallel block of interest. In this case, step S27 first selects a recording medium piece containing the first block, then sequentially selects recording medium pieces containing the second, third, and fourth blocks.

If, after the recording medium piece containing the fourth block has been selected, there is a case in which data-writing to the entire space of the first block has not yet been completed. In this case, the recording medium piece containing the first block is selected again, step S27 repeats the processing to write out the data into the entire space of the parallel block of interest. Alternatively, step S27 continues selection of the recording medium piece containing blocks configuring the parallel block of interest until it finishes data-writing to the write-object file.

If step S30 judges data-writing to the entire space of the parallel block of interest to have been completed, the processing proceeds to step S31 to further judge whether or not data-writing of all the data in the write-object file has been completed. If step S31 judges data-writing of all the data to the write-object file to be incomplete, the processing returns to step S26. In step S26, a non-write-object parallel block is selected as a parallel block of interest, and the processing similar to the above is repeated.

If the step S31 judges data-writing of all the data in the write-object file to have already been completed, the processing continues to step S32. In step S32, the block management information, as described referring to FIG. 4, is created and is stored in the corresponding BAT entry of the block management information storing unit 3. Then, the processing proceeds to step S33, and the file name recognized is therein written to the file management storing unit 2 as file management information. The above ends the writing process.

Figure 14:
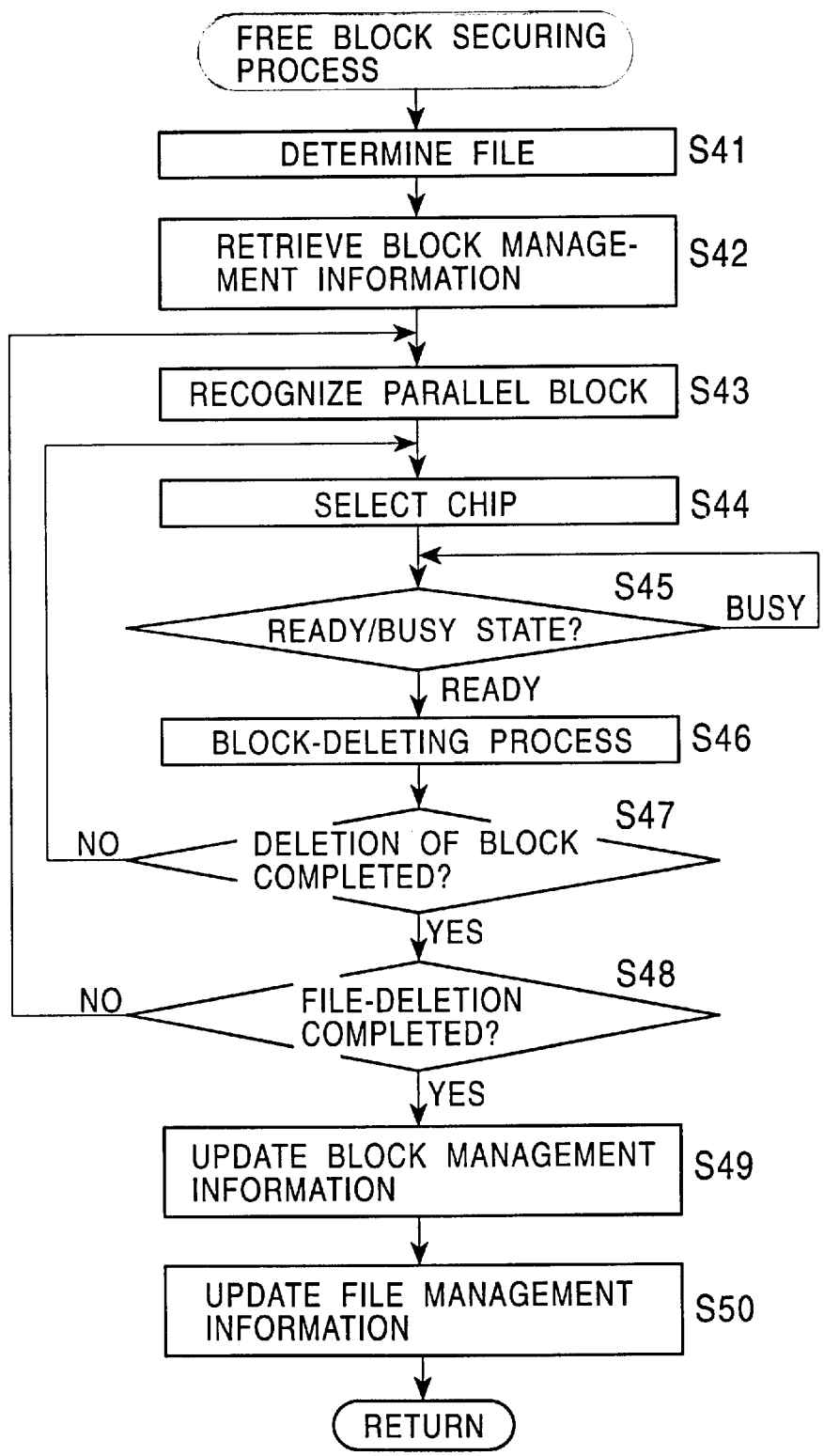
FIG. 14 is a flowchart illustrative of a free block securing processing performed in step S24 of FIG. 13.

Hereinbelow, referring to a flowchart in FIG. 14, a free block securing process is described.

In the free block securing process, a file existing in the storage is deleted for securing a free area for data-writing. To do this, step S41 first determines a file to be deleted (hereinafter, this maybe referred to as a "delete-object file"). That is, the recording medium control unit 42 determines, for example, the logically-oldest file is deleted. Alternatively, the recording medium control unit 42 displays names of files recorded in the recording medium 1, and requests the user to operate the operating unit 11 and to specify the file name, thereby determining the specified file to be the delete-object file.

The processing then proceeds to step S42. In this step, the recording medium control unit 42 retrieves the block management information and fetches the block management information and the block-link management information. The the processing proceeds to step S43. According to the block management information and the block-link management information related to the delete-object file, step S43 recognizes a parallel block configured for the delete-object file. That is, the recording medium control unit 42 detects the first flag from the block management information corresponding to the delete-object file, and also, accesses (references) the link information in the block-link management information, thereby recognizing the parallel block (Hereinbelow, the parallel block recognized is referred to as the "recognized parallel block".).

Subsequently, the processing proceeds to step S44. In this step, one of the recording medium pieces 1A through 1D constituting the recording medium 1, which contains the block comprising the recognized parallel block, is selected as the selected recording medium piece, and a chip-selecting signal is supplied to the selected recording medium piece. In step S44 also, as in step S27 shown in FIG. 13, for example, in data-writing of the delete-object file, the recording medium piece, which has been given priority and selected earlier in writing of the delete-object file, is defined as the selected recording medium piece with precedence. In this case, the block selected earlier with precedence in configuring of the parallel block group (sequence of blocks configuring the parallel block) can be recognized according to, for example, the I number in the block-link information.

After defining the selected recording medium piece, the processing proceeds to step S45. As in step 28 in FIG. 13, step S45 judges the state of the selected recording medium piece. If step S45 judges the selected recording medium piece to be in a Busy state, the selected recording medium piece cannot be accessed; therefore, the processing returns to step S45. At this time, immediately after the free block securing process is started, normally, the recording medium piece is not in the Busy state (but, it is in a Ready state). If step S45 judges the selected recording medium piece to be in a Ready state, the processing proceeds to step S46, and the step deletes data recorded in a block of the recognized parallel block in the selected recording medium piece.

As described above, data is written in units of pages, while data is deleting in units of blocks.

After one-block data has been deleted in step S46, the processing proceeds to step S47. This step judges whether or not all the data in the recognized parallel block has been completed. If the step S47 judges the all the data in the recognized parallel block to be incomplete, the processing proceeds to step S44. In this step, the next recording medium piece is defined as the selected recording medium piece according to the precedence described above, and then, the similar processes are repeated.

If step S47 judges the all the data in the recognized parallel block to have been completed, the processing proceeds to step S48. Step S48 judges whether or not deletion of all the data in the delete-object file has been completed. If the step S48 judges deletion of all the data in the delete-object file to be in incomplete, the processing returns to step S43. In this step, as described above, a parallel block from which data has not yet been deleted is selected from the group of blocks, in which the delete-object file, is recorded as a new recognized parallel block, and step S44 and the subsequent processes are repeated.

If step S48 judges deletion of all the data in the delete-object files to have been completed, the processing proceeds to step S49. This step invalidates the file management information and file-link management information in the delete-object file, thereby terminating the free block securing process. Then, processing control is returned to the default.

Hereinbelow, referring to a flowchart in FIG. 15, a description will be given of a process to be performed by the recording medium control unit 42 for deleting a file (data) recorded in the recording medium 1 (deleting process)

The deleting process is started by, for example, user operation of the operating unit 11. In response to the user operation of the operating unit 11, the operating unit 11 issue a signal instructing deletion of a file (hereinafter, this may be referred to as a "delete-instruction signal") to the recording medium control unit 42. This allows the recording medium control unit 42 to recognize the file recorded in the recording medium 1 in step S61. Then, the recording medium control unit 42 accesses, for example, the file management information and displays the file name, which is recorded in the recording medium 1, on the display unit 12. Consecutively, the user operates the operating unit 11 and specifies the name of the file to be deleted (delete-object file). In response to this operation, in step S62, the recording medium control unit 42 determines (recognizes) the specified file as the delete-object file.

Subsequently, the processing proceeds to step S63. Steps S63 to S71 perform the similar processes as in steps S42 to S50 in FIG. 14.

Figure 15:
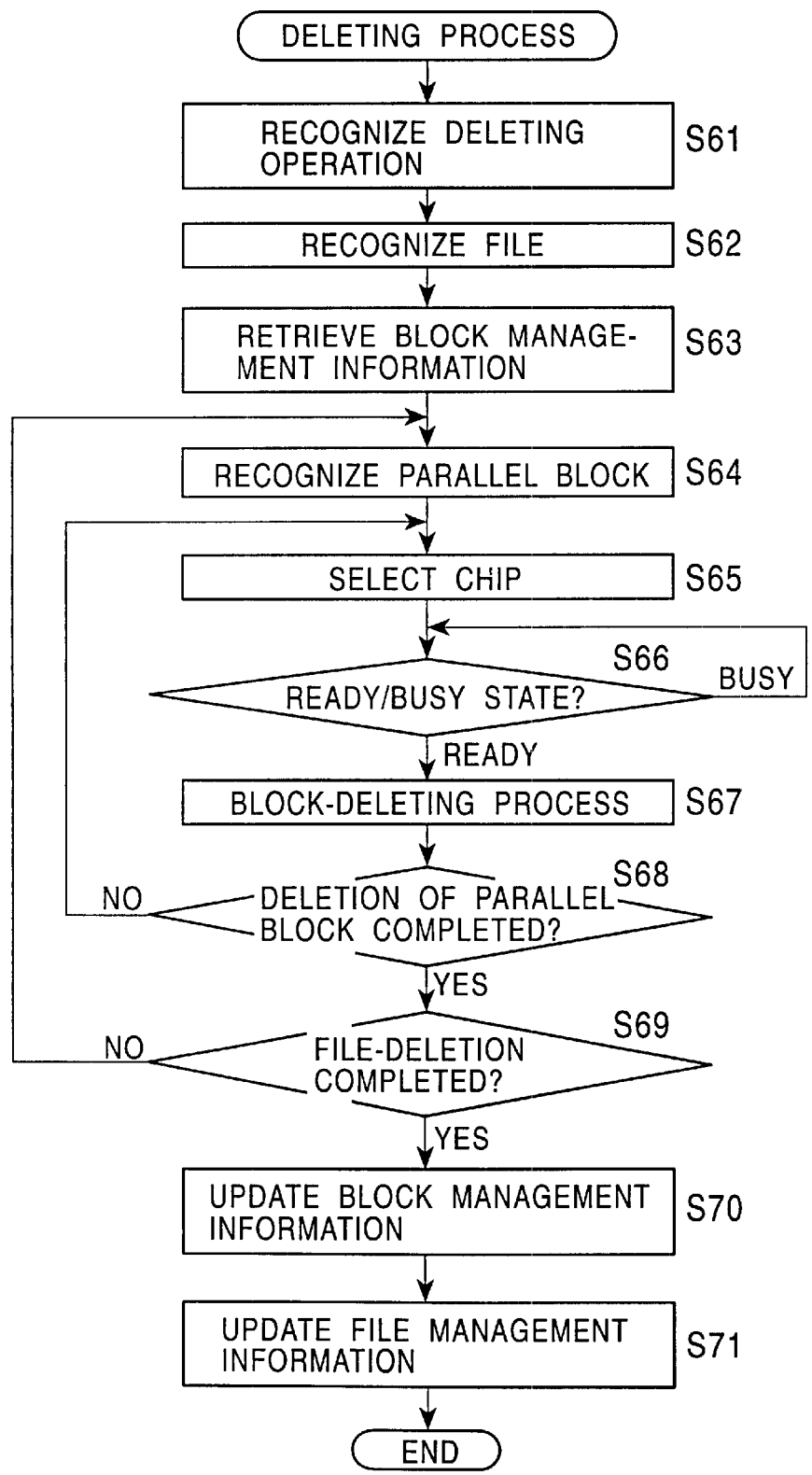
FIG. 15 is a flowchart illustrative of a deleting processing.

The deleting process in FIG. 15 invalidates the block management information, block-link management information, the file management information, and the file-link management information after deleting data of the file recorded in the recording medium 1. Accordingly, after the file data is fiscally deleted, the block management information, block-link management information, the file management information, and the file-link management information regarding the file are invalidated, and then the block in which the file data has been recorded becomes usable as a free block.

However, with the recording medium 1 for which, for example, a NAND flash memory is used, problems are caused. Generally, the NAND flash memory has characteristics in that the program time necessary for deleting data into the flash memory is relatively longer. Therefore, when processing occurs after deletion of a file, the processing must await a relatively long time until completion of rewriting of the block management information, block-link management information, the file management information, and the file-link management information.

Therefore, in response to the instruction for deleting a file, the program performs only the process (step S71) for invalidating the file management information and the file-link management information for the file to be deleted. That is, only logical deletion of the file is preferably performed, and physical deletion of the file is preferably performed in, for example, an idle time when the recording medium control unit 42 is not processing a particular job. Alternatively, when a recording medium control unit 42 of a multitask type, the deletion may be performed in the background.

In the above case, step S61 in FIG. 15 recognizes the operation for deleting the file recorded in the recording medium 1, the processing skips steps S62 to S70 and proceeds to step S71. In this step, the file management information and the file-link management information for the delete-object file is invalidated. Subsequently, steps S62 to S70 are performed in the free time or in the background.

The above allows other processes to be prevented from a long wait time which is attributed to the physical deletion of files.

When steps S62 to S70 are performed in the free time or in the background of the recording medium control unit 42, step S62 detects, for example, block information with the file number n of which file name is not recorded in the file management storing unit 2 as file management information from data identification information F[n:s] in the block management information. In this case, data of the block being managed by the block management information having the aforementioned data identification information is recognized as an object of deletion.

Figure 16:
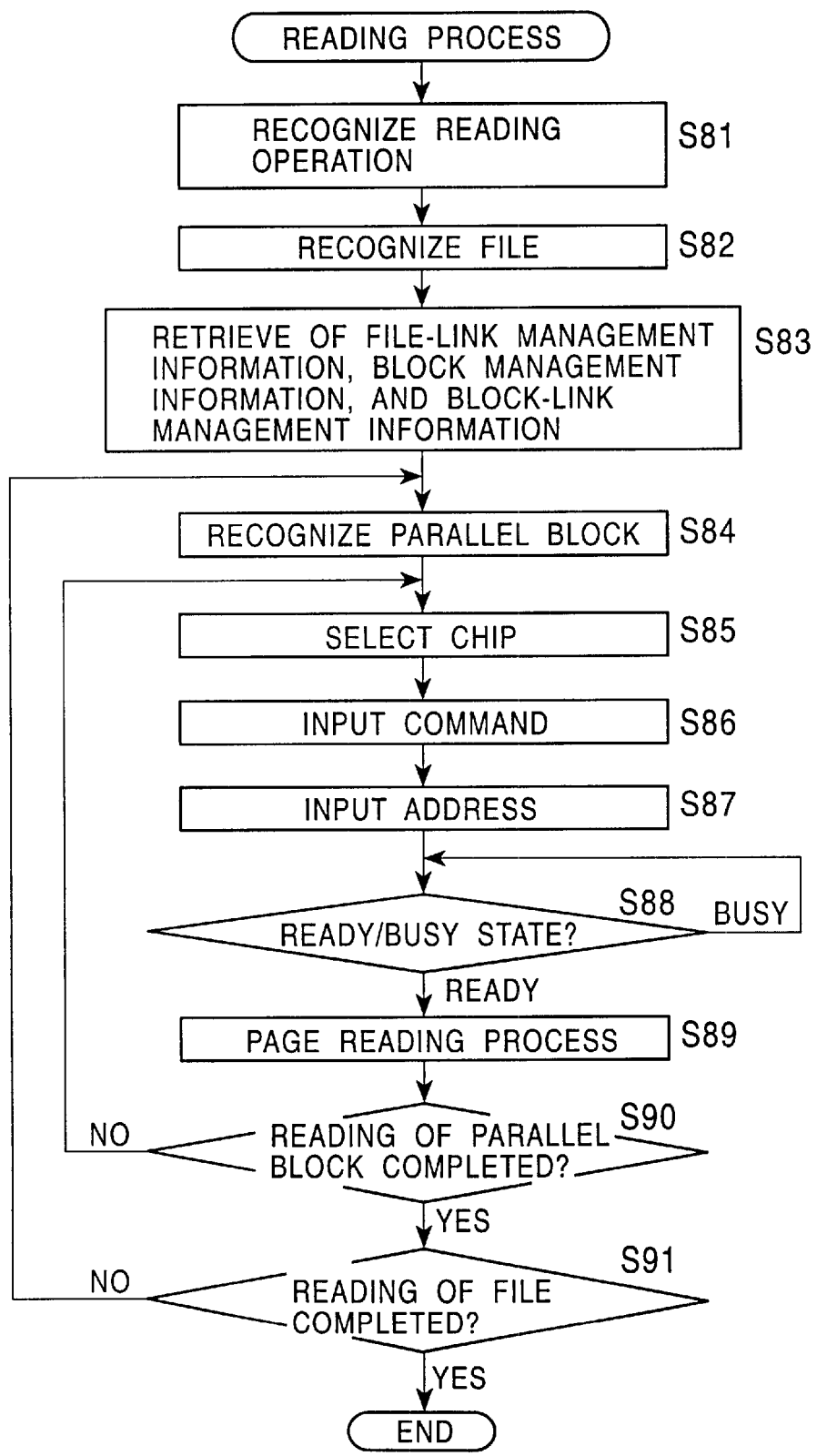
FIG. 16 is a diagram illustrative of a reading processing.

Hereinbelow, referring to a flowchart in FIG. 16, a description will be given of a process (reading process) to be performed by the recording medium control unit 42 shown in FIG. 10 in reading data recorded in the recording medium 1.

In reading the data (file) recorded in the recording medium 1, for example, the user operates the operating unit 11 so as to reproduce data. Accordingly, as described above, a reproduction-instructing signal is provided to the recording medium control unit 42 from the operating unit 11. Then, in step S81, the recording medium control unit 42 recognizes the instruction signal for performing data-reading from the recording medium 1.

As described above, in response to the reproduction-instructing signal, the recording medium control unit 42 accesses the file management information in the file management information storing unit 2, and controls the display unit 12 via the reproduction control unit 43, thereby displaying file names recorded in the recording medium 1. The user then sees the file name displayed on the display unit 12 and operates the operating unit 11, thereby specifying the name of file to be read out from the recording medium 1. In step S82, the above specification allows the recording medium control unit 42 to recognize the file (read-object file) to be read out from the recording medium 1.

Consecutively, the processing proceeds to step S83. This step allows the recording medium control unit 42 to fetch the file-link management information, the block management information, and the block-link management information corresponding to the write-object file. Then, the processing proceeds to step S84. According to the information retrieved in step S83, step S84 recognizes the parallel block configured for the read-object file. That is, for example, the recording medium control unit 42 sequentially searches through forward entries in the block-link management information stored in the BAT entries designated by start entries recorded in the file-link management information for the read-object file so as to be the block sequence corresponding to the read-object file. Also, at this time, the recording medium control unit 42 references a loop flag in the block management information, thereby recognizing the parallel block (hereafter, this parallel block recognized may be referred to as the "recognized parallel block").

Then, the processing proceeds to step S85. Step S85 defines one of the recording medium pieces 1A to 1D constituting the recording medium 1, which contains the block comprising the recognized parallel block, as the selected recording medium piece (this recording medium piece selected may also be referred to as the "selected recording medium piece"). A chip-selecting signal is supplied to the selected recording medium piece. In step S85 also, as in step S27 in FIG. 11, for example, the recording medium piece having a block selected earlier for writing the read-object file at configuration of the parallel block is defined as the selected recording medium piece with precedence.

[0313]
Following definition of the selected recording medium piece, the processing proceeds to step S86. This step provides a read command to the selected recording medium piece, and then passes process control to step S87. Step S87 provides the address from which data will be read, and passes process control to step S88.

Figure 13:
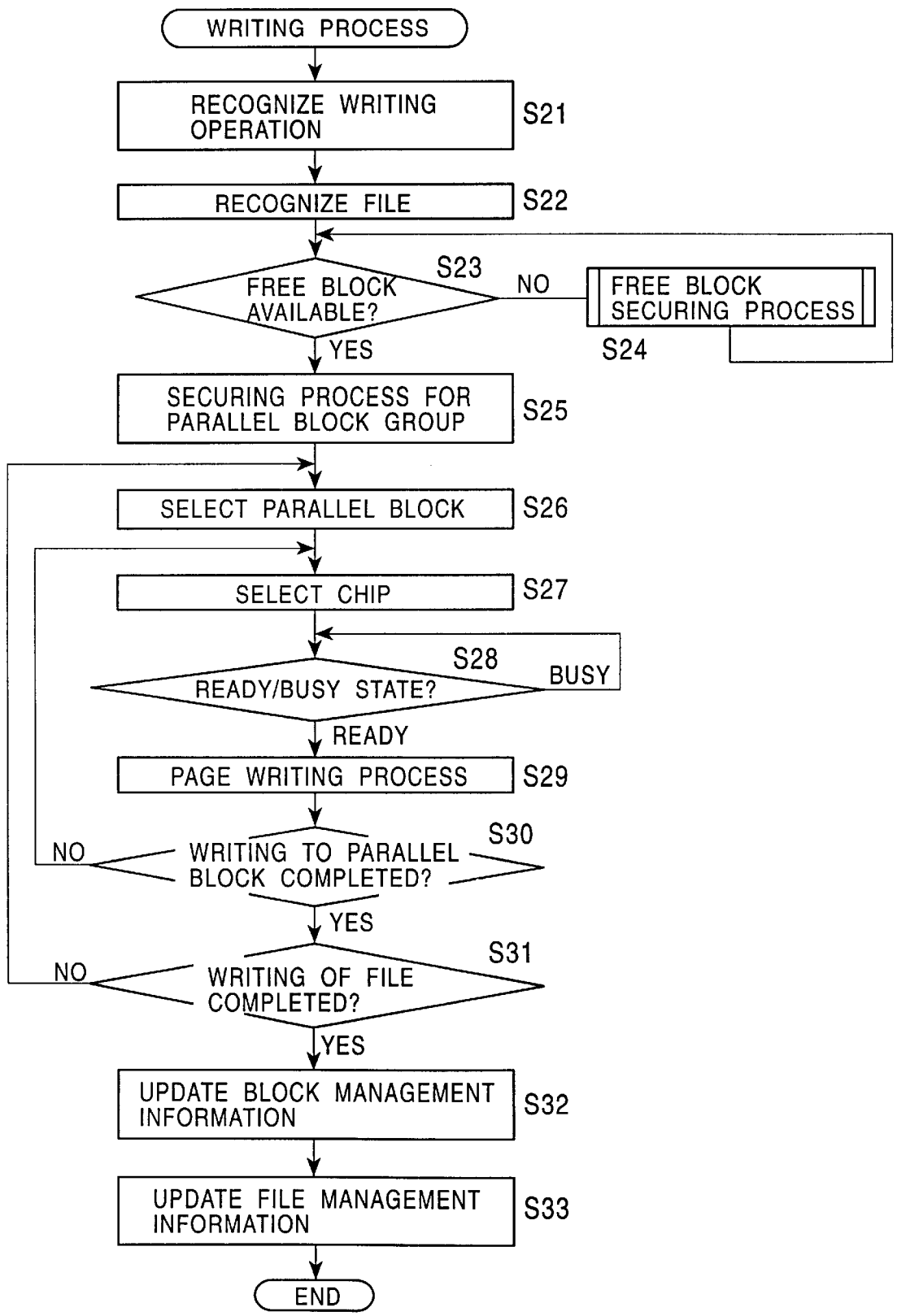
FIG. 13 is a flowchart illustrative of a writing process.

As in step S28 in FIG. 13, step S88 judges the state of the selected recording medium piece. If step S88 judges the selected recording medium piece to be in a Busy state, the selected recording medium piece cannot be accessed, therefore returning process control to step S88. If step S88 judges the selected recording medium piece to be in a Ready state, the processing proceeds to step S89. The step S89 reads out one-page data recorded in a block comprising the recognized parallel block in the selected recording medium piece.

In the course of loop processing including steps S85 to S90 described below, step S89 allows one-page data-reading from a block to be carried out sequentially beginning with the first address of the block. Specifically, suppose a parallel block is configured of four blocks, namely, the first to fourth blocks, each of which is configured of four pages, namely, the first to fourth pages beginning with the first address. In this case, step S89 carries out data-reading sequentially from the first page of the first block, the first page of the second block, the first page of the third block, and then the first page of the fourth block. Subsequently, data-reading is carried out sequentially from the second page of the first block, the second page of the second block, the second page of the third block, and then the second page of the fourth block. Data-reading continues in this manner until reading out data in the fourth page of the fourth block.

The one-page data read out in step S89 is then supplied from the recording medium control unit 42 to the transfer control unit 41 or the reproducing control unit 43. Then, the processing proceeds to step S90 in which judgement is made whether or not data-reading of all the data of the recognized parallel block has been completed. If step S90 judges data-reading of all of the data in the recognized parallel block to be incomplete, the processing returns to step S85. The step S85 selects the next recording medium piece with the precedence as described above, and provides chip-selecting signal thereto.

If the step S90 judges data-reading of all the data in the recognized parallel block to have been completed, the processing proceeds to step S91. The step S91 judges whether or not data-reading of all of the data in the read-object file has been completed. If step S91 judges data-reading of all the read-object file to be incomplete, the processing returns to step S84. In this step, in the group of parallel blocks recording the read-object file, a parallel block from which data-reading has not yet been carried out, the next recording medium piece is selected as a new recognized parallel block, and step S85 and subsequent processes are repeated. If step S91 judges data-reading of all of the data in the read-object file to have been completed, the reading process ends.

Hereinbelow, as shown in FIG. 5, the user terminal in FIG. 10 uses the file-link management information containing start entries and end entries, and the block-link management information containing rewind entries and forward entries. Therefore, the user terminal can easily perform the forward reproduction and the reverse reproduction at an N-time speed.

First, referring to a flowchart in FIG. 17, a description will be given of the fast-reproduction control process to be performed by the recording medium control unit 42 for implementing the N-time-speed fast reproduction.

A user-operation of the operating unit 11 issues an instruction to the recording medium control unit 42 so as to perform the N-time-speed forward reproduction. First, in step S101, in response to the user instruction, the recording medium control unit 42 sets 1 to the variable n as the default. The processing then proceeds to step S102 that judges whether or not a page which is to currently be reproduced (reproduction-object page) is a page in which the last data in a file which is to currently be reproduced (reproduction-object file) is recorded. If step S102 judges the reproduction-object page to be a page in which the last data in the reproduction-object file is recorded, the processing proceeds to step S103. Step S103 accesses the file management information, recognizes a file following the current reproduction-object file according to a logical order, and determines the recognized file as a new reproduction-object file. Also, by accessing the file-link management information in the new reproduction-object file, step S103 recognizes a start entry thereof and defines a block to be managed by a BAT entry designated by the start entry. Step S103 thereby defines the aforementioned block as a block including a page to be reproduced next (hereinafter, this may be referred to as the "jump block"). The processing then proceeds to step S109.

If step S102 judges the reproduction-object page to be not a page in which the last data in the reproduction-object file is recorded, the processing proceeds to step S104. Step S104 further judges whether or not the reproduction-object page is a page in the last block of the parallel block. If step S104 judges the reproduction-object page to be not a page in the last block of the parallel block, the processing proceeds to step S105. Step S105 accesses the block-link management information of the block that contains the reproduction-object page and thereby recognizes a forward entry thereof. Furthermore, step S105 defines the block to be managed by the BAT entry designated by the recognized by the forward entry as the jump block. Then, the processing proceeds to step S109.

If step S104 judges the reproduction-object page to be a page in the last block of the parallel block, the processing proceeds to step S106. Step S106 further judges whether or not the reproduction-object page is a page in the last block of the parallel block. If step S106 judges the reproduction-object page to be not a page in the last block of the parallel block, the processing proceeds to step S107. Step S107 defines the first block of the parallel block as the jump block. Then, the processing proceeds to step S109.

If step S104 judges the reproduction-object page to be a page in the last block of the parallel block, the processing proceeds to step S108. As in step S105, step S107 defines the block to be managed by the BAT entry designated by the recognized forward entry as the jump block. Then, the processing proceeds to step S109.

Step S109 judges whether or not the variable n is the same as N representing the N-time speed. If the step S109 judges them to be not the same, the processing proceeds to step S110 in which the variable n increases by 1. Subsequently, the processing returns to step S102 in which the similar processes are repeated with a page in the jump block which is defined as the next reproduction-object page. If the step S109 judges the variable n to be the same as N representing the N-time speed, the processing proceeds to step S111. In step S89 of the reading process in FIG. 16, step S111 allows the recording medium control unit 42 to control data-reading so as to start with the new reproduction-object page in the jump block. Then, the processing returns to step S101.

Hereinbelow, referring to a flowchart in FIG. 18, a description will be given of the reverse-reproduction control process to be performed by the recording medium control unit 42 for implementing the N-time-speed reverse reproduction.

A user-operation of the operating unit 11 issues an instruction to the recording medium control unit 42 so as to perform the N-time-speed reverse reproduction. First, in step S121, in response to the user instruction, the recording medium control unit 42 sets 1 to the variable n as the default. The processing then proceeds to step S122 that judges whether or not a reproduction-object page is a page in which the first data in a reproduction-object file is recorded. If step S102 judges the reproduction-object page to be a page in which the first data in the reproduction-object file is recorded, the processing proceeds to step S123. Step S123 accesses the file management information, recognizes the previous file of the current reproduction-object file according to a logical order, and determines the recognized file as a new reproduction-object file. Also, by accessing the file-link management information in the new reproduction-object file, step S123 recognizes the end entry thereof and defines a block to be managed by a BAT entry designated by the end entry. Step S123 thereby defines the aforementioned block as a block including a page to be reproduced next (hereinafter, this may be referred to as the "jump block"). The processing then proceeds to step S129.

If step S122 judges the reproduction-object page to be not a page in which the first data in the reproduction-object file is recorded, the processing proceeds to step S124. Step S124 further judges whether or not the reproduction-object page is a page in the first block of the parallel block. If step S124 judges the reproduction-object page to be not a page in the first block of the parallel block, the processing proceeds to step S125. Step S125 accesses the block-link management information of the block that contains the reproduction-object page and thereby recognizes a rewind entry thereof. Furthermore, step S125 defines the block to be managed by the BAT entry designated by the recognized by rewind entry as the jump block. Then, the processing proceeds to step S129.

If step S124 judges the reproduction-object page to be a page in the first block of the parallel block, the processing proceeds to step S126. Step S126 further judges whether or not the reproduction-object page is a page in the first block of the parallel block. If step S126 judges the reproduction-object page to be not a page in the first block of the parallel block, the processing proceeds to step S127. Step S127 defines the last block of the parallel block as the jump block. Then, the processing proceeds to step S129.

If step S126 judges the reproduction-object page to be a page in the first block of the parallel block, the processing proceeds to step S128. As in step S125, step S128 defines the block to be managed by the BAT entry designated by the recognized rewind entry as the jump block. Then, the processing proceeds to step S129.

Step S129 judges whether or not the variable n is the same as N representing the N-time speed. If the step S129 judges them to be not the same, the processing proceeds to step S130 in which the variable n increases by 1. Subsequently, the processing returns to step S122 in which the similar processes are repeated with a page in the jump block which is defined as the next reproduction-object page. If the step S129 judges the variable n to be the same as N representing the N-time speed, the processing proceeds to step S131. In step S89 of the reading process in FIG. 16, step S131 allows the recording medium control unit 42 to control data-reading so as to start with the new reproduction-object page in the jump block. Then, the processing returns to step S121.

Without the user operation of the operating unit 11, no instruction is issued for the N-time-speed forward reproduction and reverse reproduction. In this case, the recording medium control unit 42 terminates the fast-reproduction control process in FIG. 17 and the reverse-reproduction control process in FIG. 18.

Figure 17:
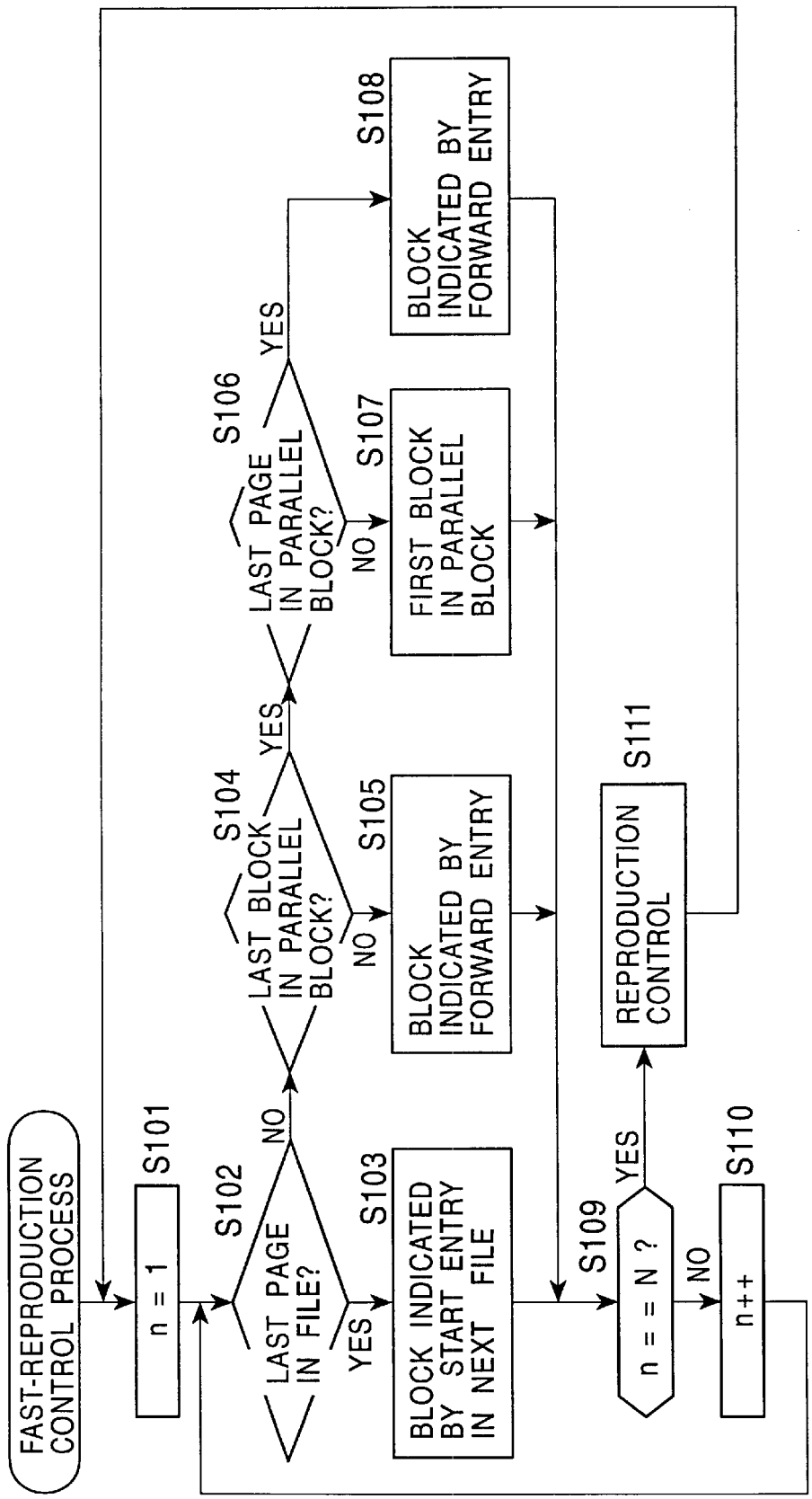
FIG. 17 is a flowchart illustrative of a fast-reproduction control processing.
Figure 18:
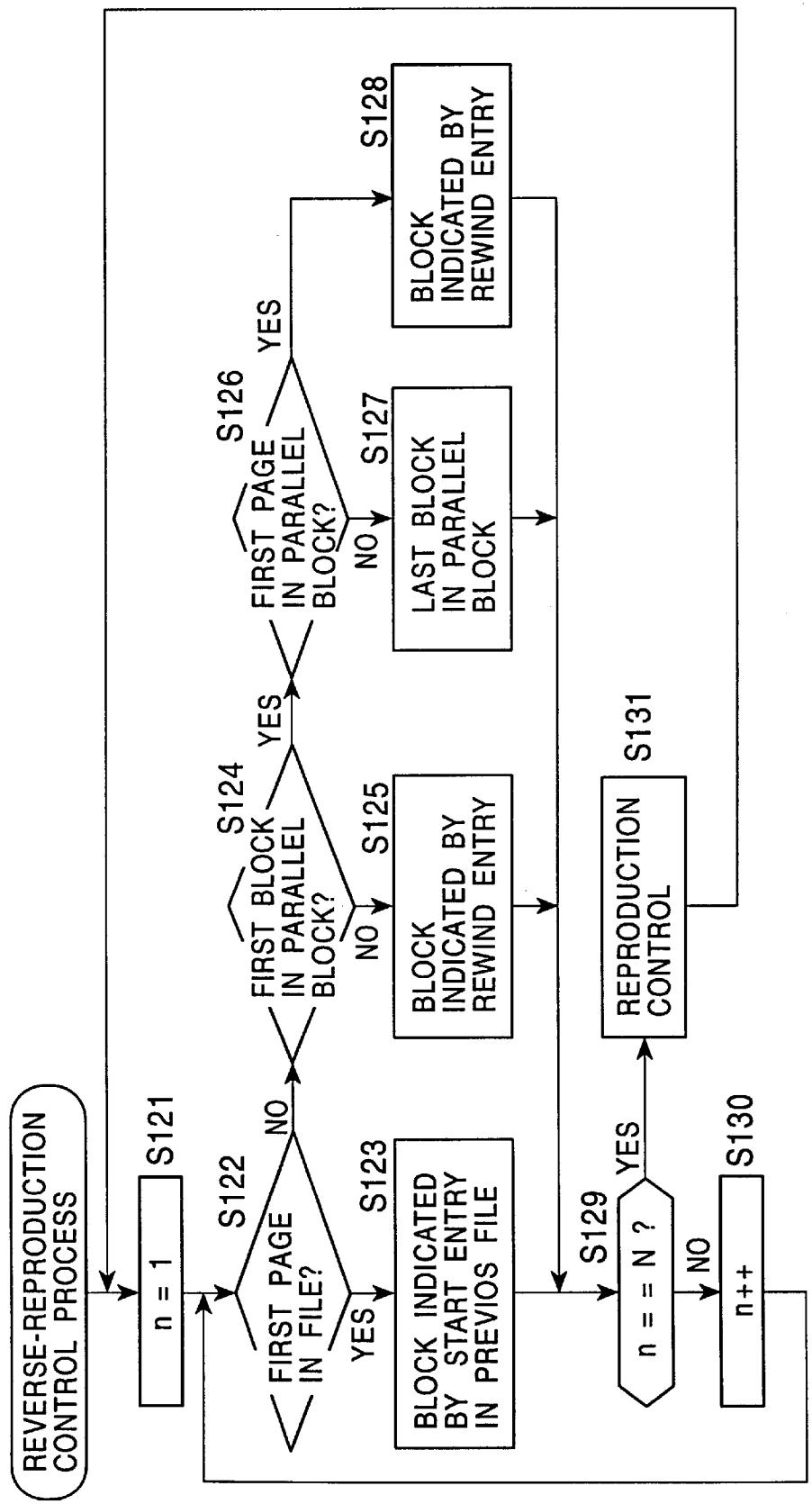
FIG. 18 is a flowchart illustrative of a reverse-reproduction control processing.
Figure 19:
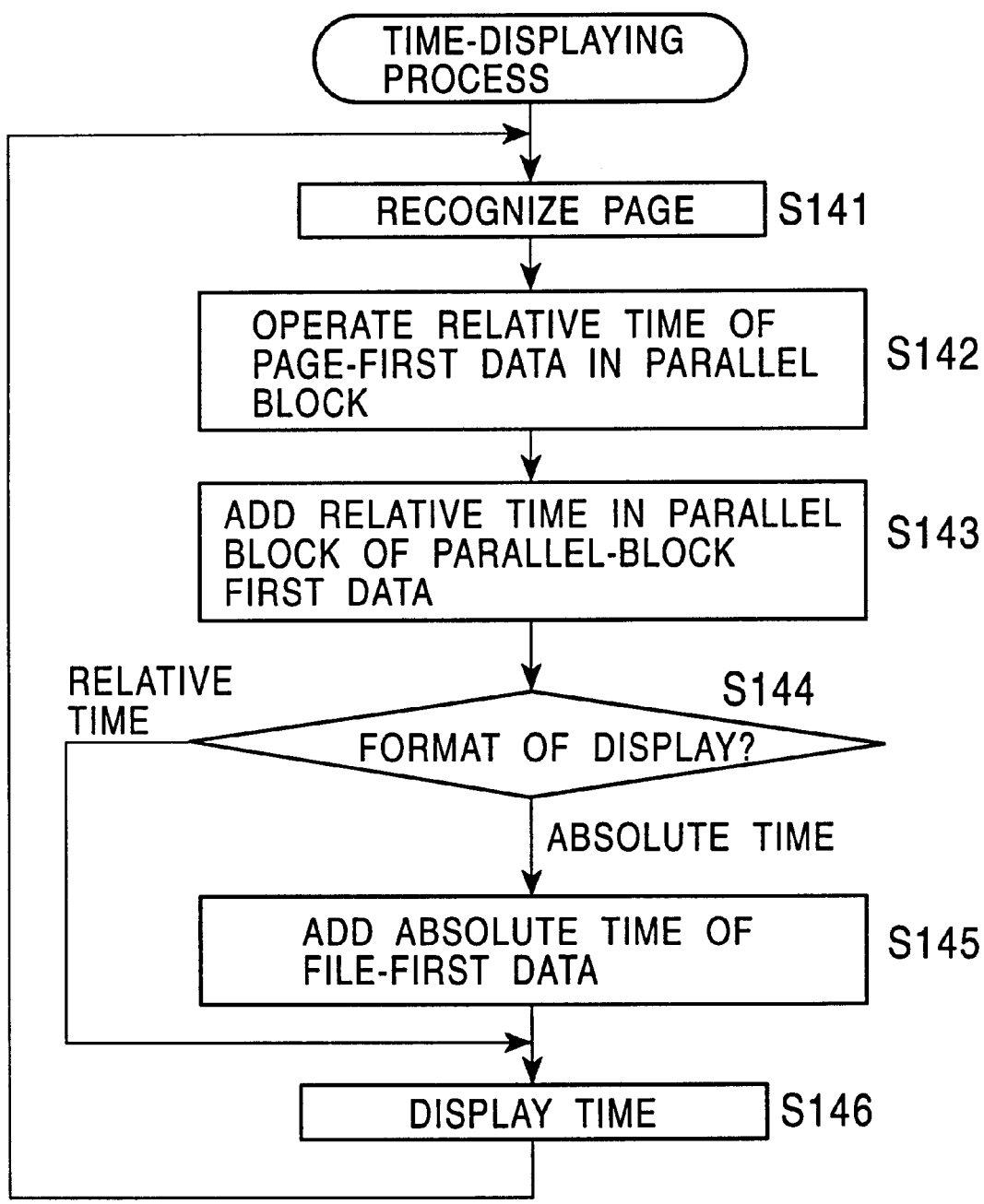
FIG. 19 is a flowchart illustrative of a time display processing.

In addition to control operations shown in FIGS. 17 and 18, the N-time-speed forward reproduction and the N-time-speed reverse reproduction allow, for example, data-reading from the recording medium 1 to be performed in the forward direction and reverse direction at the N-time speed. Furthermore, they allow the reproduction control unit 43 to process the read data at the N-time speed.

Still furthermore, as described above, the recording medium control unit 42 can define the data-reproduction time (or, recording time) and distribute it to users. In this connection, a description will be given below of a process for displaying the time of the reproduction (time-displaying process) to be performed by the recording medium control unit 42.

A user-operation of the operating unit 11 issues an instruction to the recording medium control unit 42 so as to perform the time-displaying process. First, step S141 recognizes the physical address CBP[c:b:p], and the processing proceeds to step S142. As described above, step S142 references the physical address recognized in step S141, thereby defines the inner-parallel-block reproduction-start time of the reproduction-object page, and passes processing control to step S143. Also, as described above, step S143 defines the inner-file reproduction-start time of the parallel block configured of the block including the reproduction-object page. Also, step S143 performs an add operation for the inner-parallel-block reproduction-start time defined in step S142 and the inner-file reproduction-start time, thereby defining the inner-file reproduction-start time for the reproduction-object page.

Step S144 judges which one of the inner-file reproduction-start time (time relative to the first entry of the file) and the page-reproduction start time (absolute time is to be displayed when files recorded in the recording medium 1 are sequentially reproduced) for the reproduction-object page. This judgement is performed according to the output signal of the operating unit 11. That is, the operation of the operating unit 11 allows specification of which one of the inner-file reproduction-start time and the page-reproduction start time is to be displayed for the reproduction-object page.

If step S144 judges the inner-file reproduction-start time for the reproduction-object page to be displayed, the processing skips step S145 and proceeds to step S146. Step S146 allows the inner-file reproduction-start time defined in step S143 to be supplied from the recording medium control unit 42 and to be displayed on the display unit 12. Then, the processing returns to step S141 and awaits the next page to be reproduced.

If step S144 judges the page-reproduction start time for the reproduction-object page to be displayed for the reproduction-object page, the processing proceeds to step S145. Step S145 allows the file reproduction start time for the file recorded in the reproduction-object page to be defined, as described above. Also, step S145 performs an add operation for the inner-file reproduction-start time defined in step S143 and the file reproduction start time, thereby producing the page-reproduction start time for the reproduction-object page. Then, the processing proceeds to step S146. Step S146 allows the page-reproduction start time defined in step S145 to be supplied from the recording medium control unit 42 and to be displayed on the display unit 12. Then, the processing returns to step S141 and awaits the next page to be reproduced.

A user operation of the operating unit 11 issues an instruction to the recording medium control unit 42 for stopping display of the reproduction time, thereby ending the time-displaying process.

As described above, the block management information including the file numbers for identifying the file, the sequence number representing the logical sequence of blocks in which the file data is recorded, and the data length representing the data amount are prepared. In addition, the file-link management information and the block-link management information are prepared from the block management information as the auxiliary information. Therefore, even when the file management information is missing, file accessed is possible, and in addition, flexible management or duplication can be implemented.

In these embodiments, the recording medium 1 is configured of four recording medium pieces 1A through 1D. However, the number of the recording medium pieces configuring the recording medium 1 is by no means restricted to four.

Also, in the embodiment, the recording medium 1 is formed of a flash memory made of a semiconductor memory. However, the recording medium 1 may be formed of a semiconductor memory other than the flash memory or of a randomly-accessible disk recording medium other than the semiconductor memory, such as a magnetic disk, magneto-optic disk, or phase-variable disk. When a magnetic disk or the like as is employed for the recording medium 1, blocks corresponds to sectors.

Also, the recording medium 1 may be a read-only medium, rather than a readable/writable medium. However, as long as the read-only medium is used for the recording medium 1, the user terminal functions only as a reproducing apparatus for reproducing data.

Also, the order of writing data to blocks configuring parallel blocks may be determined arbitrarily. However, when data is to be written continuously over two or more parallel blocks, the order for writing to blocks for a parallel block may preferably be correlated to the order for writing to blocks for the next parallel block.

[0349]

That is, for example, in FIG. 1, when the first and second parallel blocks comprised of four blocks are individually configured of one each from each of the recording medium pieces 1A through 1D, arrayed from the left to the right, and data-writing is to be performed to the second parallel block following writing to the first parallel block, and when data-writing is to be sequentially performed to the four blocks configuring the first parallel block from the left-end to the right, it is preferable that data-writing is sequentially performed to the four blocks configuring the second parallel block from the left end to the right, also. The reason for this is as follows; in the above case, for example, when data-writing is to be performed in a manner such that writing is sequentially performed to the four blocks configuring the second parallel block from the right end to the left, after completion of data-writing to the block in the right end of the first parallel block, data-writing is performed to the block in the right end of the second parallel block. That is, In this case, data-writing is performed continuously to the recording medium piece 1D, and when data-writing is to be performed to the first parallel block upon completion of data-writing the second parallel block, advantages cannot be obtained in the wait-time minimization due to parallel data-writing at the start time of data-writing to the second parallel block.

Also, with the user terminal configured as shown in FIG. 7, the above writing processing (FIG. 13) to the memory card 21 is performed using the information providing apparatuses shown in FIGS. 8 and 9. Accordingly, there is no need to perform writing processing (FIG. 13) to the user terminal. However, even with the user terminal configured as shown in FIG. 7, the configuration may be such so as to allow the writing process with the memory card 21 mounted in the slot 20.

Further, in FIG. 10, the file management information storing unit 2 for storing the file management information need not be provided in a physical manner. In this case, the file management information may be stored in a system block or the like secured in one of the blocks of the recording medium pieces 1A through 1D comprising the recording medium 1, for example. This is also true for the block management information storing unit 3 for storing block management information, the file-link management information storing unit 4 for storing file-link management information, and the block-link management storing unit 5 for storing block-link management information. Also, in this case, block management information and the block-link management information for managing blocks are preferably divided and stored in the individual addresses of the blocks.

As will be understood from the foregoing description, the present invention offers the following advantages.

The recording apparatus and the recording method of the first and second aspects of the present invention form file management information that manages logical sequence of the files stored in the recording medium and block management information that includes information for identifying file, information indicative of the logical sequential order of the block storing the data of the file, and information indicative of the size of the data. It is therefore possible to make access to the file based on the block management information, even if the file management information is lost.

The recording apparatus, the recording method and the recording medium of the first, second and third aspects of the present invention enable access to a file based both on file management information that manages logical sequence of the files stored in the recording medium and block management information that includes information for identifying file, information indicative of the logical sequential order of the block storing the data of the file, and information indicative of the size of the data. It is therefore possible to make access to the file based on the block management information, even if the file management information is lost.

The recording apparatus and the recording method in accordance with the sixth and seventh aspects of the present invention form block management information that includes information for identifying file, information indicative of the logical sequential order of the block storing the data of the file, and information indicative of the size of the data. Block link management information including information indicative of the states of linkage between the blocks sharing the data of the file is formed based on the block management information. It is, therefore, possible to flexibly access the file.

The recording apparatus, the recording method and the recording medium in accordance with the eighth, ninth and eleventh aspects of the present invention form block management information that includes information for identifying file, information indicative of the logical sequential order of the block storing the data of the file, and information indicative of the size of the data. Block link management information including information indicative of the states of linkage between the blocks sharing the data of the file is formed based on the block management information. Access to the file and other operations are performed based both on the block management information and the block link management information. It is, therefore, possible to flexibly access the file.

In accordance with the recording method and the recording apparatus in accordance with the eleventh and twelfth aspects of the invention, at least one parallel block constituted by at least one block, for enabling the data of a file to be recorded in at least one block in the parallel manner, is formed and the data of the file is recorded in the parallel manner in the bock or blocks constituting the parallel block. Position information concerning the position of the data of the file is computed based on the block link management information which includes information concerning the parallel block constituted by the blocks recording the data of the file. It is therefore possible to easily compute the position of the data of the file.

In accordance with the recording method, the recording apparatus and the recording medium in accordance with the thirteenth, fourteenth and sixteenth aspects of the invention, at least one parallel block constituted by at least one block, for enabling the data of a file to be recorded in at least one block in the parallel manner, is formed and the data of the file is recorded in the parallel manner in the bock or blocks constituting the parallel block. Position information concerning the position of the data of the file is computed based on the block link management information which includes information concerning the parallel block constituted by the blocks recording the data of the file. It is therefore possible to easily compute the position of the data of the file.

Although the invention has been described in its preferred forms, it is to be understood that the described embodiments are only illustrative and various changes and modification may be imparted thereto without departing from the scope of the invention which is limited solely by the appended claims.

What is claimed is:

1. A recording apparatus for recording data of a file in a parallel manner in a recording medium having a plurality of recording medium chips by managing a recording area in said recording medium on a block basis, comprising:

parallel block forming means for forming at least one parallel block constituted by at least one block, for enabling the data of said file to be recorded in units of the parallel block in the parallel manner;

record controlling means for recording the data of said file in units of the parallel block in the parallel manner, wherein each block in the parallel block is recorded on one of the medium chips, wherein blocks in the parallel block are on separate medium chips, and wherein each block in the parallel block is recorded in parallel with the other predetermined blocks in the parallel block on other medium chips;

block link management storing means for storing block link management information concerning said parallel block in which the data of said file is recorded, and a block address of said parallel block is indicated in said block link management information with an unconstrained order for blocks of said parallel block; and computing means for computing position information concerning the position of the data of said file based on said block link management information.

2. A recording apparatus according to claim 1, further comprising:

block management information storing means for storing block management information including information for identifying said file, information indicative of the logical sequential order of the block in which the data of each file is recorded, and information indicative of the size of the data recorded in said block; and block link management information forming means for forming said block link management information based on said block management information.

3. A recording apparatus according to claim 1, further comprising display means for displaying said position information.

4. A recording apparatus according to claim 1, wherein said block link management information includes information indicative of the number of the block or blocks in which the data of said file is recorded and which constitute said parallel block.

5. A recording apparatus according to claim 1, wherein said block link management information includes information concerning the sequential order within said parallel block of the block or blocks in which the data of said file is recorded and which constitute said parallel block.

6. A recording apparatus according to claim 1, further comprising file link management information storing means for storing file link management information including information indicative of the size of said file;

wherein said computing means computes said position information concerning the data of said file based on said block link management information and said file link management information.

7. A recording apparatus according to claim 6, further comprising file link management information forming means for forming said file link management information based on said block management information.

8. A recording apparatus according to claim 1, wherein said computing means determines said position information in terms of the position of said data of said file relative to the position of the leading end of the parallel block containing the block or blocks in which the data of said file is stored.

9. A recording apparatus according to claim 1, wherein said computing means determines said position information in terms of the position relative to the position of the leading end of said file in said parallel block containing the block or blocks in which the data of said file is stored.

10. A recording apparatus according to claim 1, wherein said computing means determines said position information in terms of the position of said file relative to the logical leading end of said recording medium.

11. A recording method for recording data of a file in a parallel manner in a recording medium having a plurality of recording medium chips by managing a recording area in said recording medium on a block basis, comprising:

parallel block forming step for forming at least one parallel block constituted by at least one block, for enabling the data of said file to be recorded in units of the parallel block in the parallel manner;

record controlling step for recording the data of said file in units of the parallel block in the parallel manner, wherein each block in the parallel block is recorded on one of the medium chips, wherein blocks in the parallel block are on separate medium chips, and wherein each block in the parallel block is recorded in parallel with the other predetermined blocks in the parallel block on other medium chips; and computing step for computing position information concerning the position of the data of said file based on block link management information which includes information concerning the parallel block in which the data of said file is recorded, and a block address of said parallel block is indicated in said block link management information with an unconstrained order for blocks of said parallel block.

12. A recording method according to claim 11, further comprising:

a block link management information forming step for forming said block link management information based on block management information including information for identifying said file, information indicative of the logical sequential order of the block in which the data of each file is recorded, and information indicative of the size of the data recorded in said block.

13. A recording method according to claim 11, further comprising a displaying step for displaying said position information.

14. A recording method according to claim 11, wherein said block link management information includes information indicative of the number of the block or blocks in which the data of said file is recorded and which constitute said parallel block.

15. A recording method according to claim 11, wherein said block link management information includes information concerning the sequential order within said parallel block of the block or blocks in which the data of said file is recorded and which constitute said parallel block.

16. A recording method according to claim 11, further comprising a file link management information storing step for storing file link management information including information indicative of the size of said file;

wherein said computing step computes said position information concerning the data of said file based on said block link management information and said file link management information.

17. A recording method according to claim 16, further comprising a file link management information forming step for forming said file link management information based on said block management information.

18. A recording method according to claim 11, wherein said computing step determines said position information in terms of the position of said data of said file relative to the position of the leading end of the parallel block containing the block or blocks in which the data of said file is stored.

19. A recording method according to claim 11, wherein said computing step determines said position information in terms of the position relative to the position of the leading end of said file in said parallel block containing the block or blocks in which the data of said file is stored.

20. A recording method according to claim 11, wherein said computing step determines said position information in terms of the position of said file relative to the logical leading end of said recording medium.

21. A reproducing apparatus for reproducing, by managing a recording area of a recording medium having a plurality of recording medium chips on a block basis, data of a file which has been stored in said recording medium in a parallel manner, wherein at least one parallel block constituted by at least one block, for enabling the data of the file to be recorded in units of the parallel block in the parallel manner, has been formed and said data of said file has been recorded in said parallel manner in units of the parallel block, said reproducing apparatus comprising:

block link management information storing means for storing block link management information concerning said parallel block in which the data of said file is recorded, and a block address of said parallel block is indicated in said block link management information with an unconstrained order for blocks of said parallel block;

reproduction controlling means for reproducing the data of said file in units of the parallel block in the parallel manner based on said block link management information, wherein each block in the parallel block is recorded on one of the medium chips, wherein blocks in the parallel block are on separate medium chips, and wherein each block in the parallel block is reproduced in parallel with the other predetermined blocks in the parallel block on other medium chips; and computing means for computing, based on said block link management information, position information concerning the position of the data of said file which is being reproduced.

22. A reproducing apparatus according to claim 21, further comprising:

block management information storing means for storing block management information including information for identifying said file, information indicative of the logical sequential order of the block in which the data of each file is recorded, and information indicative of the size of the data recorded in said block; and block link management information forming means for forming said block link management information based on said block management information.

23. A reproducing apparatus according to claim 21, further comprising display means for displaying said position information.

24. A reproducing apparatus according to claim 21, wherein said block link management information includes information indicative of the number of block or blocks in which the data of said file is recorded and which constitute said parallel block.

25. A reproducing apparatus according to claim 21, wherein said block link management information includes information concerning the sequential order within said parallel block of the block or blocks in which the data of said file is recorded and which constitute said parallel block.

26. A reproducing apparatus according to claim 21, further comprising file link management information storing means for storing file link management information including information indicative of the size of said file;
wherein said computing means computes said position information concerning the data of said file based on said block link management information and said file link management information.

27. A reproducing apparatus according to claim 26, further comprising file link management information forming means for forming said file link management information based on said block management information.

28. A reproducing apparatus according to claim 21, wherein said computing means determines said position information in terms of the position of said data of said file relative to the position of the leading end of the parallel block containing the block or blocks in which the data of said file is stored.

29. A reproducing apparatus according to claim 21, wherein said computing means determines said position information in terms of the position relative to the position of the leading end of said file in said parallel block containing the block or blocks in which the data of said file is stored.

30. A reproducing apparatus according to claim 21, wherein said computing means determines said position information in terms of the position of said file relative to the logical leading end of said recording medium.

31. A reproducing method for reproducing, by managing a recording area of a recording medium having a plurality of recording medium chips on a block basis, data of a file which has been stored in said recording medium in a parallel manner, wherein at least one parallel block constituted by at least one block, for enabling the data of the file to be recorded in units of the parallel block in the parallel manner, has been formed and said data of said file has been recorded in said parallel manner in units of the parallel block, said reproducing method comprising:
reproducing controlling step for reproducing the data of said file in units of the parallel block in the parallel manner based on block link management information, wherein each block in the parallel block is recorded on one of the medium chips, wherein blocks in the parallel block are on separate medium chips, and wherein each block in the parallel block is reproduced in parallel with the other predetermined blocks in the parallel block on other medium chips, the block link management information including information concerning the parallel block in which the data of said file has been recorded, and a block address of said parallel block is indicated in said block link management information with an unconstrained order for blocks of said parallel block; and
computing step for computing, based on said block link management information, position information concerning the position of the data of said file which is being reproduced.

32. A reproducing method according to claim 31, further comprising:
block link management information forming step for forming said block link management information, based on block management information which includes information for identifying said file, information indicative of the logical sequential order of the block in which the data of each file is recorded, and information indicative of the size of the data recorded in said block.

33. A reproducing method according to claim 31, further comprising displaying step for displaying said position information.

34. A reproducing method according to claim 31, wherein said block link management information includes information indicative of the number of block or blocks in which the data of said file is recorded and which constitute said parallel block.

35. A reproducing method according to claim 31, wherein said block link management information includes information concerning the sequential order within said parallel block of the block or blocks in which the data of said file is recorded and which constitute said parallel block.

36. A reproducing method according to claim 31, further comprising file link management information storing step for storing file link management information including information indicative of the size of said file;
wherein said computing step computes said position information concerning the data of said file based on said block link management information and said file link management information.

37. A reproducing method according to claim 36, further comprising file link management information forming step for forming said file link management information based on said block management information.

38. A reproducing method according to claim 31, wherein said computing step determines said position information in terms of the position of said data of said file relative to the position of the leading end of the parallel block containing the block or blocks in which the data of said file is stored.

39. A reproducing method according to claim 31, wherein said computing step determines said position information in terms of the position relative to the position of the leading end of said file in said parallel block containing the block or blocks in which the data of said file is stored.

40. A reproducing method according to claim 31, wherein said computing step determines said position information in terms of the position of said file relative to the logical leading end of said recording medium.

41. A recording medium having a recording area including a plurality of recording medium chips managed on a predetermined block basis to record data of a file in a parallel manner,
wherein at least one parallel block constituted by at least one block, for enabling the data of a file to be recorded in units of the parallel block in said recording area in the parallel manner, has been formed and said data of said file has been recorded in units of the parallel block in said parallel manner, wherein each block in the parallel block is recorded on one of the medium chips, wherein blocks in the parallel block are on separate medium chips, and wherein each block in the parallel block is recorded in parallel with the other predetermined blocks in the parallel block on other medium chips, and position information concerning the position of the data of said file is computed, based on block link management information including information concerning the parallel block in which the data of said file is recorded, and a block address of said parallel block is indicated in said block link management information with an unconstrained order for blocks of said parallel block.

42. A recording medium according to claim 41, wherein said block link management information is formed based on block management information which includes information for identifying said file, information indicative of the logical sequential order of the block in which the data of each file is recorded, and information indicative of the size of the data recorded in said block.

43. A recording medium according to claim 41, wherein said position information is displayed.

44. A recording medium according to claim 41, wherein said block link management information includes information indicative of the number of block or blocks in which the data of said file is recorded and which constitute said parallel block.

45. A recording medium according to claim 41, wherein said block link management information includes information concerning the sequential order within said parallel block of the block or blocks in which the data of said file is recorded and which constitute said parallel block.

46. A recording medium according to claim 41, wherein said position information concerning the data of said file is computed also based on file link management information including information indicative of the size of said file.

47. A recording medium according to claim 46, wherein said file link management information is formed based on said block management information.

48. A recording medium according to claim 41, wherein said position information is determined in terms of the position of said data of said file relative to the position of the leading end of the parallel block containing the block or blocks in which the data of said file is stored.

49. A recording medium according to claim 41, wherein said position information is determined in terms of the position relative to the position of the leading end of said file in said parallel block containing the block or blocks in which the data of said file is stored.

50. A recording medium according to claim 41, wherein said position information is determined in terms of the position of said file relative to the logical leading end of said recording medium.

* * * * *